US010683091B2

(12) United States Patent
Sopper et al.

(10) Patent No.: US 10,683,091 B2
(45) Date of Patent: *Jun. 16, 2020

(54) AERODYNAMIC TOTE PACKAGE

(71) Applicant: Wing Aviation LLC, Mountain View, CA (US)

(72) Inventors: Clark Sopper, Redwood City, CA (US); Matthew Day, Oakland, CA (US); Adam Woodworth, Santa Clara, CA (US); Joanna Cohen, Mountain View, CA (US)

(73) Assignee: Wing Aviation LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/381,811

(22) Filed: Apr. 11, 2019

(65) Prior Publication Data

US 2019/0233110 A1    Aug. 1, 2019

Related U.S. Application Data

(63) Continuation of application No. 15/295,494, filed on Oct. 17, 2016, now Pat. No. 10,308,360.
(Continued)

(51) Int. Cl.
*B64D 1/08* (2006.01)
*B65D 5/18* (2006.01)
(Continued)

(52) U.S. Cl.
CPC .............. *B64D 1/08* (2013.01); *B64C 39/024* (2013.01); *B65D 5/18* (2013.01); *B65D 5/2033* (2013.01);
(Continued)

(58) Field of Classification Search
CPC ... B65D 5/18; B65D 5/46; B65D 5/42; B65D 5/468; B65D 6/08; B65D 25/22;
(Continued)

(56) References Cited

U.S. PATENT DOCUMENTS 1,876,982 A * 9/1932 Lichter ................ B65D 5/4616
229/117.13
2,922,562 A * 1/1960 Pellaton ............... B65D 5/3685
229/110
(Continued)

FOREIGN PATENT DOCUMENTS

EP    1 103 472    5/2001
GB    267 453    3/1927
(Continued)

OTHER PUBLICATIONS

Shannon et al., U.S. Appl. No. 15/389,338, filed Dec. 22, 2016, 175 pages.
(Continued)

*Primary Examiner* — Corey N Skurdal
(74) *Attorney, Agent, or Firm* — McDonnell Boehnen Hulbert & Berghoff LLP.

(57) ABSTRACT

A tote package including a middle section that forms a bottom portion, a first side section connecting the first side section and the middle section, wherein the first side section creates a first side portion of the tote package that tapers upwardly from the bottom portion to a top portion of the tote package, and a second side section that is opposite of the that connecting the second side section and the middle section, wherein the second side section creates a second side portion of the tote package that tapers upwardly from the bottom portion to the top portion of the top portion of the tote package, a handle positioned on the top portion of the tote package, wherein the middle section, first side section, and
(Continued)

second side section intersect to create a tapered front portion of the tote package that extends beyond the bottom portion.

20 Claims, 24 Drawing Sheets

Related U.S. Application Data

(60) Provisional application No. 62/243,065, filed on Oct. 17, 2015.

(51) Int. Cl.
| | | |
|---|---|---|
| *B65D 5/20* | (2006.01) | |
| *B65D 5/24* | (2006.01) | |
| *B65D 5/468* | (2006.01) | |
| *B64C 39/02* | (2006.01) | |
| *B65D 5/42* | (2006.01) | |
| *B65D 81/00* | (2006.01) | |

(52) U.S. Cl.
CPC ........... *B65D 5/241* (2013.01); *B65D 5/4208* (2013.01); *B65D 5/4266* (2013.01); *B65D 5/4608* (2013.01); *B65D 81/00* (2013.01); *B64C 2201/128* (2013.01)

(58) Field of Classification Search
CPC ... B65D 5/36; B64D 1/16; B64D 9/00; B64D 1/12; B64D 7/00; B64D 1/22; B64D 1/02
See application file for complete search history.

(56) References Cited

U.S. PATENT DOCUMENTS

| | | | | |
|---|---|---|---|---|
| 2,985,355 | A * | 5/1961 | Read | B65D 33/02 383/6 |
| 3,405,859 | A * | 10/1968 | Phillips, Jr. | B65D 5/18 229/108 |
| 3,904,156 | A * | 9/1975 | Smith | B64D 1/22 244/118.1 |
| 4,179,060 | A * | 12/1979 | Meyers | B65D 5/0227 206/277 |
| 4,269,348 | A * | 5/1981 | Young | B65D 5/4616 229/115 |
| 5,334,537 | A | 8/1994 | Lee et al. | |
| 5,337,947 | A * | 8/1994 | Eskandry | B60Q 7/005 206/459.5 |
| 5,344,203 | A * | 9/1994 | Tollenaere | B64D 1/22 244/137.1 |
| 5,356,069 | A * | 10/1994 | Bochet | B65D 31/00 229/104 |
| 5,437,406 | A * | 8/1995 | Gordon | B65D 5/18 229/104 |
| 5,788,186 | A * | 8/1998 | White | B64C 1/22 244/1 TD |
| 6,334,537 | B1 * | 1/2002 | Tepper | A45C 7/0081 206/315.1 |
| 6,698,382 | B1 * | 3/2004 | Blaszak | A01K 1/0125 119/168 |
| 7,090,029 | B2 * | 8/2006 | Cleary | A62C 3/0235 169/36 |
| 7,762,194 | B2 * | 7/2010 | Gaigler | F42B 12/58 102/357 |
| 7,887,011 | B1 * | 2/2011 | Baldwin | B64C 37/02 244/118.1 |
| 8,162,263 | B2 * | 4/2012 | Wong | B64C 39/024 244/137.4 |
| 8,882,737 | B2 * | 11/2014 | Graf | A61M 1/1656 383/104 |
| 9,085,362 | B1 * | 7/2015 | Kilian | B64F 1/02 |
| 9,205,922 | B1 * | 12/2015 | Bouwer | B64D 9/00 |
| 9,308,994 | B2 * | 4/2016 | Uskert | B64D 7/08 |
| 9,346,547 | B2 * | 5/2016 | Patrick | B64C 39/024 |
| 9,536,216 | B1 * | 1/2017 | Lisso | G06Q 10/0832 |
| 2002/0076471 | A1 * | 6/2002 | Olsson | B65D 75/008 426/86 |
| 2008/0099622 | A1 * | 5/2008 | Yoffe | B64D 1/02 244/137.4 |
| 2011/0133036 | A1 * | 6/2011 | Goddard | B64D 1/16 244/137.3 |
| 2011/0226763 | A1 * | 9/2011 | Valencia | B65D 5/3657 220/6 |
| 2013/0238135 | A1 * | 9/2013 | Fisher | B66C 21/00 700/275 |
| 2014/0212068 | A1 * | 7/2014 | Yu | B65D 75/008 383/7 |

FOREIGN PATENT DOCUMENTS

| | | |
|---|---|---|
| GB | 1 568 088 | 5/1980 |
| WO | 2012077115 | 6/2012 |
| WO | 2016/024276 A1 | 2/2016 |

OTHER PUBLICATIONS

Shannon et al., U.S. Appl. No. 15/389,138, filed Dec. 22, 2016, 170 pages.

Prager et al., U.S. Appl. No. 15/389,290, filed Dec. 22, 2016, 182 pages.

Prager et al., U.S. Appl. No. 15/389,304, filed Dec. 22, 2016, 172 pages.

Shannon et al., U.S. Appl. No. 15/389,326, filed Dec. 22, 2016, 172 pages.

Sopper et al., U.S. Appl. No. 15/295,494, filed Oct. 17, 2016, 82 pages.

Shannon et al., U.S. Appl. No. 15/179,585, filed Jun. 10, 2016, 67 pages.

International Searching Authority, International Search Report and Written Opinion dated Jan. 24, 2017, issued in connection with International Application No. PCT/US2016/057315, filed on Oct. 17, 2016, 16 pages.

France-Presse, Agence, "Switzerland begins postal delivery by drone," The Guardian, https://www.theguardian.com/technology/2015/jul/08/swiss-post-begins-testing-postal-delivery-by-unmanned-drone, Jul. 7, 2015, 2 pages.

Hern, Alex, "DHL launches first commercial drone 'parcelcopter' delivery service," The Guardian, https://www.theguardian.com/technology/2014/sep/25/german-dhl-launches-first-commerical-drone-delivery-service, Sep. 25, 2014, 2 pages.

Roberts et al., "Amazon dismayed by proposed FAA rules on commercial use of drones," The Guardian, https://www.theguardian.com/world/2015/feb/15/amazon-faa-rules-commercial-use-drones, Feb. 15, 2015, 2 pages.

Thielman, Sam, "Congress warned that drones present 'A nightmare scenario for civil liberties'," The Guardian, https://www.theguardian.com/technology/2015/jun/17/congress-drones-nightmare-scenario-for-civil-liberties, Jun. 17, 2015, 3 pages.

The Extended European Search Report for PCT/US2016/057315 dated Jan. 4, 2019, pp. 1-10.

France-Presse, Agence, "Switzerland begins postal delivery by drone," The Guardian, https://lwww.theguardian.com/technology/2015/jul/08/swiss-post-begins-testing-postal-delivery-by-unmanned-drone, Jul. 7, 2015, 3 pages.

Hern, Alex, "OHL launches first commercial drone 'parcelcopter' delivery service," The Guardian, https://www.theguardian.com/technology/2014/sep/25/german-dhl-launches-first-commerical-drone-delivery-service, Sep. 25, 2014, 3 pages.

Roberts et al., "Amazon dismayed by proposed FAA rules on commercial use of drones," The Guardian, https://www.theguardian.com/world/2015/feb/15/amazon-faa-rules-commercial-use-drones, Feb. 15, 2015, 3 pages.

Thielman, Sam, "Congress warned that drones present 'A nightmare scenario for civil liberties'," The Guardian, https://www.theguardian.

(56) References Cited

OTHER PUBLICATIONS com/technology/2015/jun/17/congress-drones-nightmare-scenario-for-civil-liberties, Jun. 17, 2015, 4 pages.

* cited by examiner

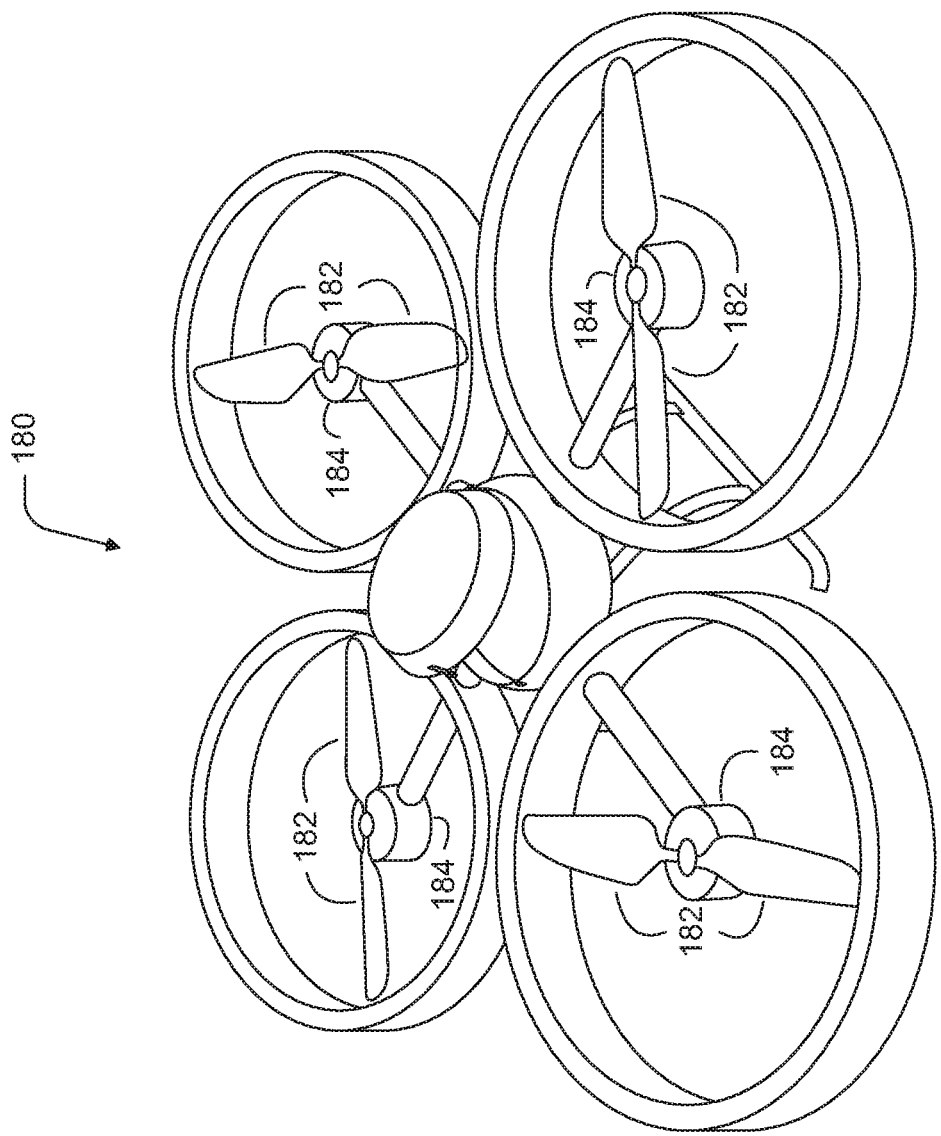

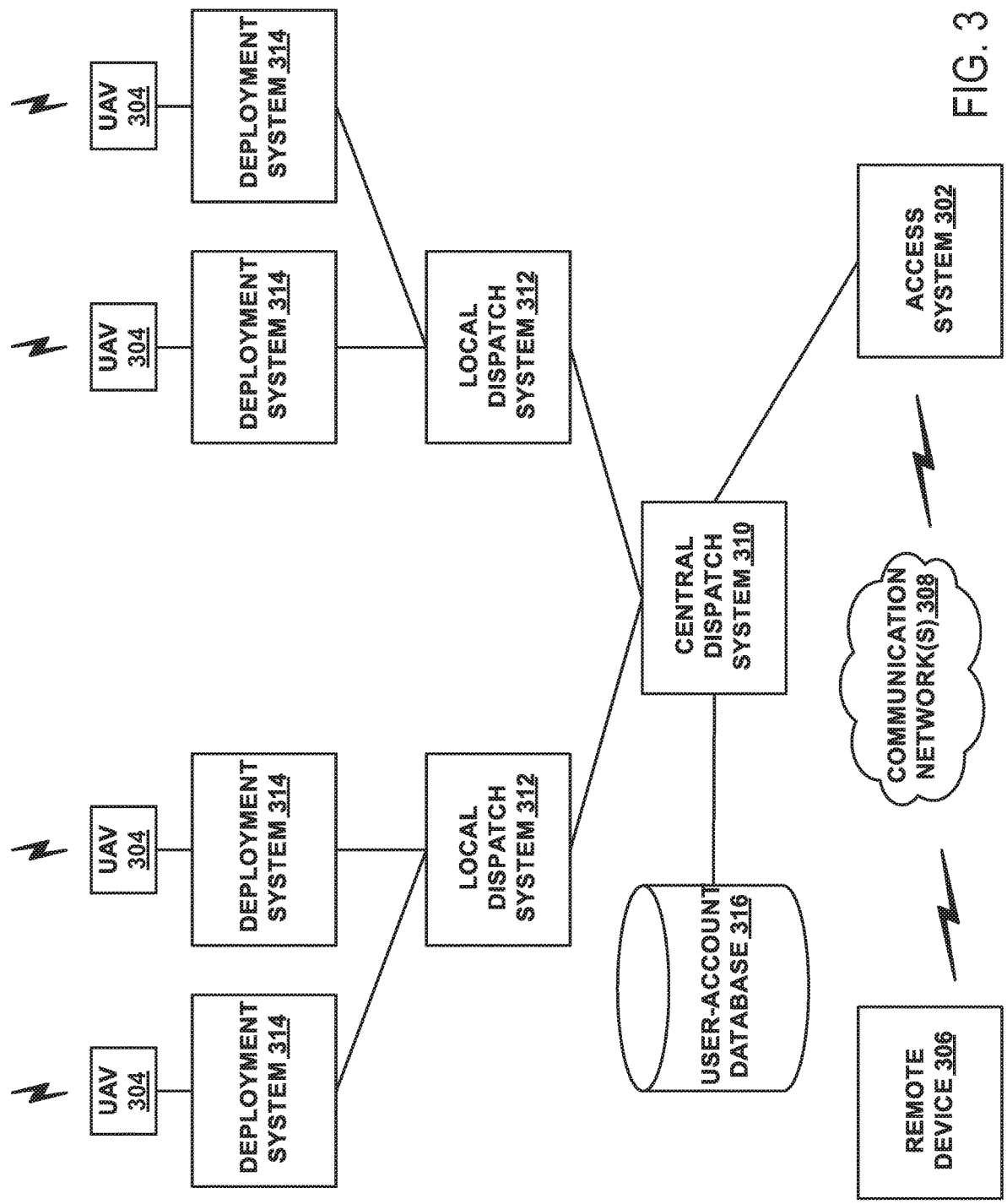

AERODYNAMIC TOTE PACKAGE

This application claims priority to U.S. Provisional Application No. 62/243,065 entitled "Aerodynamic Tote Package" filed on Oct. 17, 2015, and claims priority to U.S. Non-Provisional application Ser. No. 15/295,494 entitled "Aerodynamic Tote Package" filed on Oct. 17, 2016, the entire contents of both are hereby incorporated by reference.

BACKGROUND

An unmanned vehicle, which may also be referred to as an autonomous vehicle, is a vehicle capable of travel without a physically-present human operator. An unmanned vehicle may operate in a remote-control mode, in an autonomous mode, or in a partially autonomous mode.

When an unmanned vehicle operates in a remote-control mode, a pilot or driver that is at a remote location can control the unmanned vehicle via commands that are sent to the unmanned vehicle via a wireless link. When the unmanned vehicle operates in autonomous mode, the unmanned vehicle typically moves based on pre-programmed navigation waypoints, dynamic automation systems, or a combination of these. Further, some unmanned vehicles can operate in both a remote-control mode and an autonomous mode, and in some instances may do so simultaneously. For instance, a remote pilot or driver may wish to leave navigation to an autonomous system while manually performing another task, such as operating a mechanical system for picking up objects, as an example.

Various types of unmanned vehicles exist for various different environments. For instance, unmanned vehicles exist for operation in the air, on the ground, underwater, and in space. Examples include quad-copters and tail-sitter UAVs, among others. Unmanned vehicles also exist for hybrid operations in which multi-environment operation is possible. Examples of hybrid unmanned vehicles include an amphibious craft that is capable of operation on land as well as on water or a floatplane that is capable of landing on water as well as on land. Other examples are also possible.

SUMMARY

Example systems and methods may be provided for a tote package that can be generated by folding a sheet of material to create an aerodynamic and watertight tote package. The total package may be attached externally to a UAV to deliver goods external to the UAV. The tote package may be designed to move the majority of the package volume and frontal area away from the wing to reduce the effect on the airflow around the wing. The tote package may be designed to have tapering sides that act as a narrow pylon to reduce interference effects on the wing. The tote package may also have a handle to allow a user to easily carry the tote package and which may be used to secure the tote package to the fuselage of a UAV.

In one aspect, a device is provided including a sheet of material configured to fold into a tote package that attaches to an aerial vehicle and carries a load within the tote package external to the vehicle, the sheet of material including a middle section that creates a bottom portion of the tote package when the sheet of material is folded to create the tote package, a first side section that is folded at a first folding line connecting the first side section and middle section, wherein folding the first side section creates a first side portion of the tote package that tapers up from the first folding line to a top portion of the tote package; and a second side section that is folded at a second folding line opposite to the first folding line that connects the second side section and middle section, wherein folding the second side section creates a second side portion of the tote package that tapers up from the second folding line to connect to the first side portion at the top portion and create a handle at the top portion of the tote package, wherein the middle section, the first side section, and the second side section are folded to intersect to create a pointed front portion of the tote package and to create a back portion of the tote package.

In another aspect, a method for forming a tote is providing including the steps of (i) providing a sheet of material having a first fold line positioned between a first side section and a bottom section and having a second fold line positioned between a second side section and the bottom section; (ii) folding the first side section upwardly at the first fold line such that first side section tapers upwardly and inwardly from the first fold line to a top portion the tote package; (iii) folding the second side section at the second fold line such that the second side section tapers upwardly and inwardly from the second fold line to the top portion of the tote package; (iv) connecting a front of the first side section to a front of the second side section; (v) connecting a rear of the first side section to a rear of the second side section, and (vi) connecting the first side section and the second side section at the top portion of the tote package to create a handle of the tote package.

In yet a further aspect, a tote package is provided including a bottom section, a first side section extending upwardly and inwardly from a first side of the bottom section, a second side section extending upwardly and inwardly from a second side of the bottom section, wherein a top portion of the first side section and a top portion of the second side section are attached to form a top of the tote package.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

FIG. 1E is a simplified illustration of an unmanned aerial vehicle, according to an example embodiment.

FIG. 3 is a simplified block diagram illustrating a UAV system, according to an example embodiment.

DETAILED DESCRIPTION

Figure 1A:
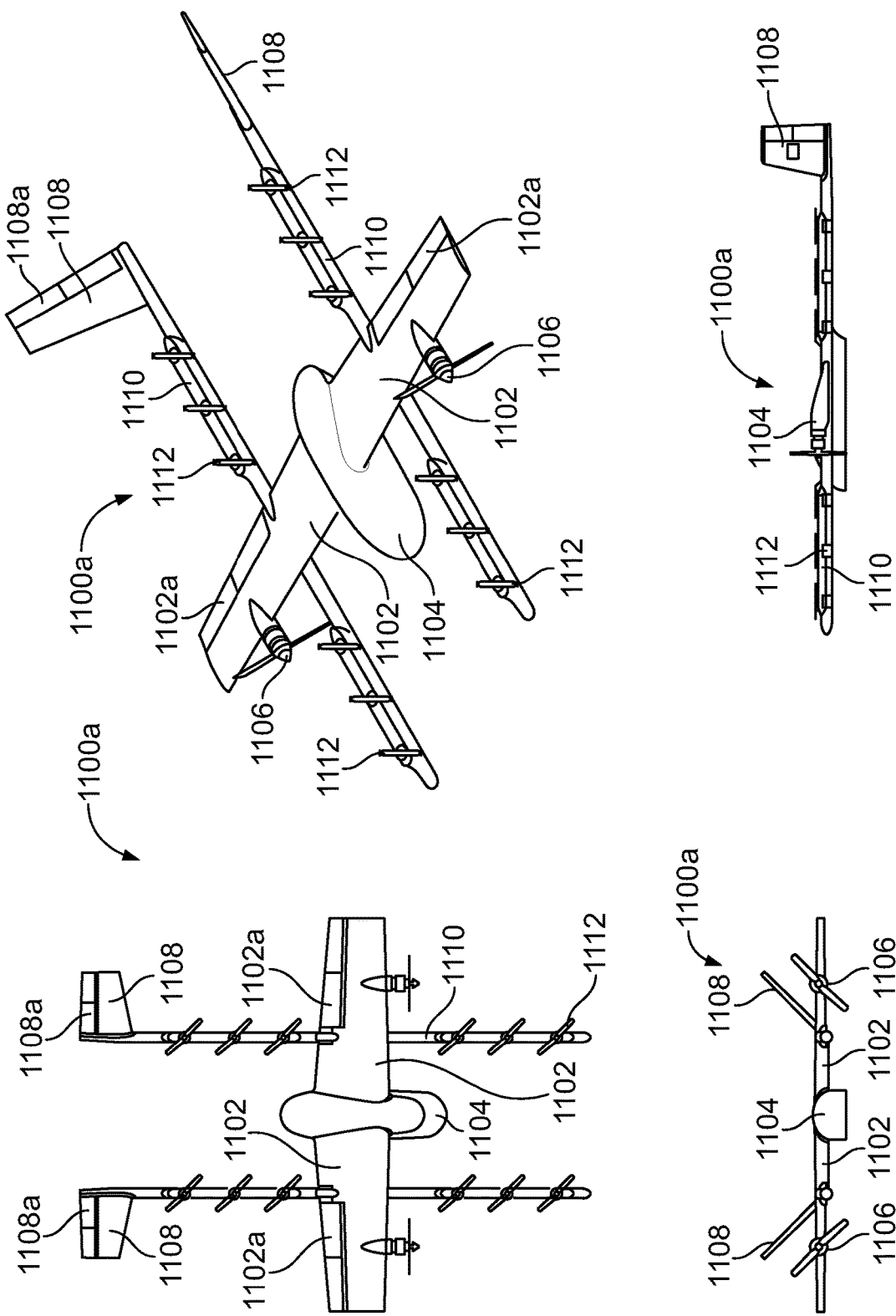
FIG. 1A is a simplified illustration of an unmanned aerial vehicle, according to an example embodiment.

Exemplary methods and systems are described herein. It should be understood that the word "exemplary" is used herein to mean "serving as an example, instance, or illustration." Any implementation or feature described herein as "exemplary" or "illustrative" is not necessarily to be construed as preferred or advantageous over other implementations or features. In the figures, similar symbols typically identify similar components, unless context dictates otherwise. The example implementations described herein are not meant to be limiting. It will be readily understood that the aspects of the present disclosure, as generally described herein, and illustrated in the figures, can be arranged, substituted, combined, separated, and designed in a wide variety of different configurations, all of which are contemplated herein.

I. OVERVIEW

The present embodiments are related to the use of unmanned aerial vehicles (UAVs) or unmanned aerial systems (UASs) (referred to collectively herein as UAVs) that are used to carry a payload to be delivered or retrieved. As examples, UAVs may be used to deliver or retrieve a payload to or from an individual or business. In operation the payload to be delivered is secured to the UAV and the UAV is then flown to the desired delivery site. Once the UAV arrives at the delivery site, the UAV may land to deliver the payload, or operate in a hover mode and lower the payload from the UAV towards the delivery site using a tether and a winch mechanism positioned with the UAV.

In order to transport the goods efficiently, a package containing the goods may be attached to the outside of the UAV. However, transporting items in a package that is external to the UAV may be challenging for at least these reasons.

First, the package must be able to protect its contents from the environment, including hot or cold temperatures, moisture, dirt, insects, impact, and/or other objects of the environment. Second, the package may create aerodynamic drag on the system including the UAV and the package. Additional drag makes delivery of the package inefficient and expensive due to high fuel costs. Third, the package and the contents of the package may shift during UAV flight. Accordingly, a device is described that may overcome these challenges.

The device may include a sheet of material configured to fold into a tote package that can attach to a UAV to carry contents external to the vehicle. The sheet of material may include a middle section, a first side section, and a second side section. The middle section may correspond to a bottom portion of the tote package when the sheet of material is folded. The first and second side sections may be folded at corresponding folding lines to generate first and second side portions of the tote package.

The first and second side portions of the tote package may taper up from a wide bottom portion of the tote package to create a narrow top portion of the tote package. The top portion of the tote package may include a handle and a vehicle connection section that attaches the package to the UAV. Further, the first and second side sections and the middle section may be folded to intersect at a point, thereby creating a pointed front portion of the tote package. The first and second side sections and the middle section may also intersection to create a back portion of the tote package, which may also be pointed.

A single sheet of material may be folded to create the tote package without requiring any additional expensive tools. The material may be cardboard, paper, or some other material used for creating packages. Thus, the cost of creating the tote package may be low enough to make it more efficient to leave the tote package at the delivery site. As a result, the return flight of the UAV after delivery of the package is more efficient with lower fuel costs because the UAV does not need to return an empty package to the shipper.

Additionally, the outer mold line of the tote package may create less drag than a traditional rectangular box. Once the sheet of material is folded, the resulting tote package features smooth surfaces with a pointed front edge that reduces the frontal cross-sectional area. These designed features reduce the drag on the UAV and tote package system. Furthermore, because the tote package is created by folding a single sheet of material, the tote package is less likely to have air gaps and/or excessive material (which add drag) resulting from connecting multiple sheets of material.

Furthermore, the tote package includes sides that taper from a wide bottom of the tote package to a narrow top of the tote package. The tapering design allows the package to serve as a narrow pylon that reduces interference effects on the wing(s) of the UAV. In particular, the tapering design moves some of the frontal area and volume away from the wing(s) of the UAV. As a result, the tapering design prevents reduction of lift on the wing by the tote package.

Also, the tote package includes a stabilizer that can dampen package flutter, which allows the package to have a less rigid connection to the UAV. By reducing movement of the tote package during UAV flight, the package and the contents of the package may shift less during UAV flight. Furthermore, the package also may include a handle that may be used to secure the tote package to the UAV and that makes carrying the package easier for a user.

The payload may advantageously take the form of an aerodynamic "hex-tote," where the first and second side sections and bottom section have a hexagonal shape, although the payload may have any number of different configurations and geometries. However, where a linear recessed restraint slot is positioned within the fuselage, it is desirable that the top of the payload has a generally linear shape to fit within the linear recessed restraint slot within the fuselage to secure the tote package to the fuselage of the UAV.

II. ILLUSTRATIVE UNMANNED VEHICLES

Herein, the terms "unmanned aerial vehicle" and "UAV" refer to any autonomous or semi-autonomous vehicle that is capable of performing some functions without a physically present human pilot.

A UAV can take various forms. For example, a UAV may take the form of a fixed-wing aircraft, a glider aircraft, a tail-sitter aircraft, a jet aircraft, a ducted fan aircraft, a lighter-than-air dirigible such as a blimp or steerable balloon, a rotorcraft such as a helicopter or multicopter, and/or an ornithopter, among other possibilities. Further, the terms "drone," "unmanned aerial vehicle system" (UAVS), or "unmanned aerial system" (UAS) may also be used to refer to a UAV.

FIG. 1A is a simplified illustration providing various views of a UAV, according to an example embodiment. In particular, FIG. 1A shows an example of a fixed-wing UAV 1100a, which may also be referred to as an airplane, an aeroplane, a biplane, a glider, or a plane, among other possibilities. The fixed-wing UAV 1100a, as the name implies, has stationary wings 1102 that generate lift based on the wing shape and the vehicle's forward airspeed. For instance, the two wings 1102 may have an airfoil-shaped cross section to produce an aerodynamic force on the UAV 1100a.

As depicted, the fixed-wing UAV 1100a may include a wing body or fuselage 1104. The wing body 1104 may contain, for example, control electronics such as an inertial measurement unit (IMU) and/or an electronic speed controller, batteries, other sensors, and/or a payload, among other possibilities. The illustrative UAV 1100a may also include landing gear (not shown) to assist with controlled take-offs and landings. In other embodiments, other types of UAVs without landing gear are also possible.

The UAV 1100a further includes propulsion units 1106 positioned on the wings 1106 (or fuselage), which can each include a motor, shaft, and propeller, for propelling the UAV 1100a. Stabilizers 1108 (or fins) may also be attached to the UAV 1110a to stabilize the UAV's yaw (turn left or right) during flight. In some embodiments, the UAV 1100a may be also be configured to function as a glider. To do so, UAV 1100a may power off its motor, propulsion units, etc., and glide for a period of time. In the UAV 1100a, a pair of rotor supports 1110 extend beneath the wings 1106, and a plurality of rotors 1112 are attached rotor supports 1110. Rotors 1110 may be used during a hover mode wherein the UAV 1110a is descending to a delivery location, or ascending following a delivery. In the example UAV 1100a, stabilizers 1108 are shown attached to the rotor supports 1110.

During flight, the UAV 1100a may control the direction and/or speed of its movement by controlling its pitch, roll, yaw, and/or altitude. For example, the stabilizers 1108 may include one or more rudders 1108a for controlling the UAV's yaw, and the wings 1102 may include one or more elevators for controlling the UAV's pitch and/or one or more ailerons 1102a for controlling the UAV's roll. As another example, increasing or decreasing the speed of all the propellers simultaneously can result in the UAV 1100a increasing or decreasing its altitude, respectively.

Figure 1B:
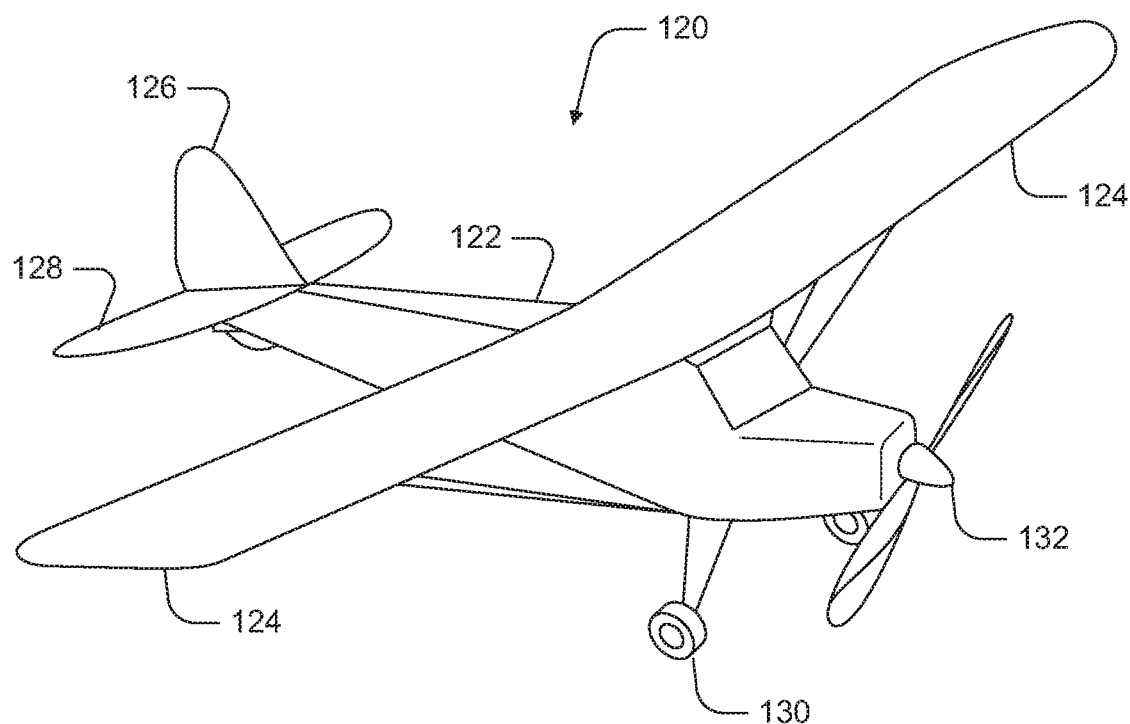
FIG. 1B is a simplified illustration of an unmanned aerial vehicle, according to an example embodiment.

Similarly, FIG. 1B shows another example of a fixed-wing UAV 120. The fixed-wing UAV 120 includes a fuselage 122, two wings 124 with an airfoil-shaped cross section to provide lift for the UAV 120, a vertical stabilizer 126 (or fin) to stabilize the plane's yaw (turn left or right), a horizontal stabilizer 128 (also referred to as an elevator or tailplane) to stabilize pitch (tilt up or down), landing gear 130, and a propulsion unit 132, which can include a motor, shaft, and propeller.

Figure 1C:
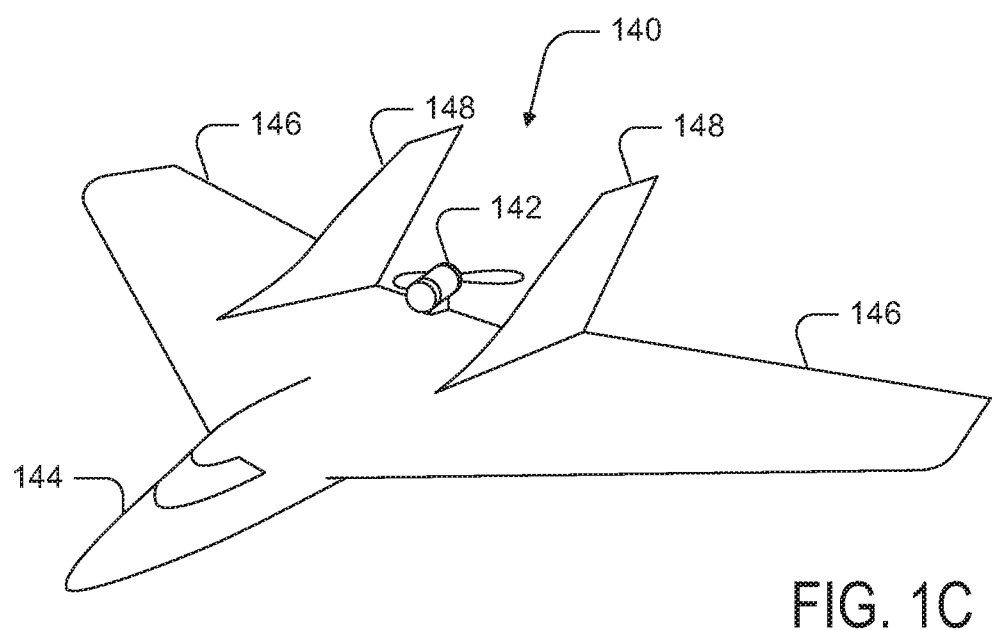
FIG. 1C is a simplified illustration of an unmanned aerial vehicle, according to an example embodiment.

FIG. 1C shows an example of a UAV 140 with a propeller in a pusher configuration. The term "pusher" refers to the fact that a propulsion unit 142 is mounted at the back of the UAV and "pushes" the vehicle forward, in contrast to the propulsion unit being mounted at the front of the UAV. Similar to the description provided for FIGS. 1A and 1B, FIG. 1C depicts common structures used in a pusher plane, including a fuselage 144, two wings 146, vertical stabilizers 148, and the propulsion unit 142, which can include a motor, shaft, and propeller.

Figure 1D:
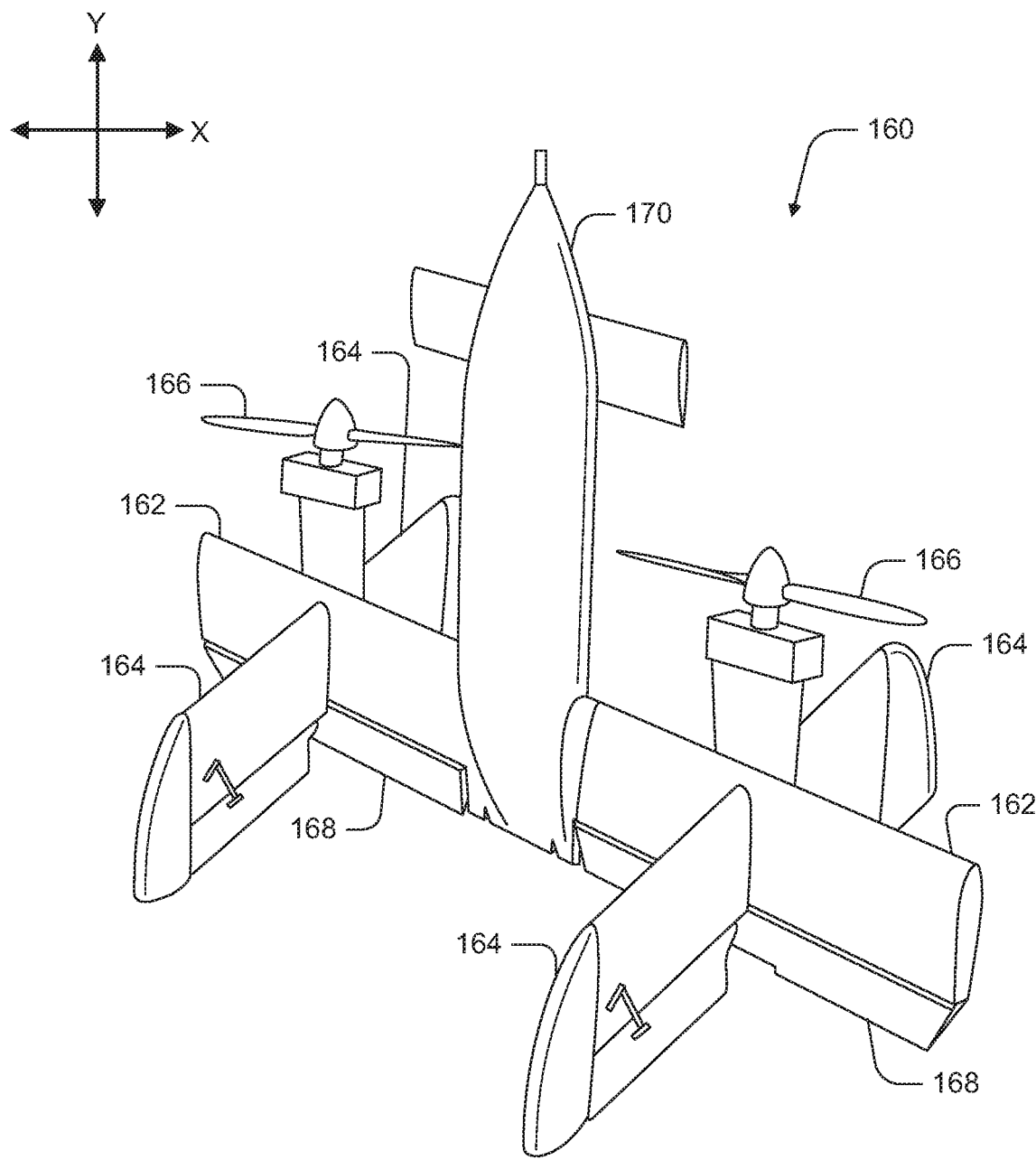
FIG. 1D is a simplified illustration of an unmanned aerial vehicle, according to an example embodiment.

FIG. 1D shows an example of a tail-sitter UAV 160. In the illustrated example, the tail-sitter UAV 160 has fixed wings 162 to provide lift and allow the UAV 160 to glide horizontally (e.g., along the x-axis, in a position that is approximately perpendicular to the position shown in FIG. 1D). However, the fixed wings 162 also allow the tail-sitter UAV 160 to take off and land vertically on its own.

For example, at a launch site, the tail-sitter UAV 160 may be positioned vertically (as shown) with its fins 164 and/or wings 162 resting on the ground and stabilizing the UAV 160 in the vertical position. The tail-sitter UAV 160 may then take off by operating its propellers 166 to generate an upward thrust (e.g., a thrust that is generally along the y-axis). Once at a suitable altitude, the tail-sitter UAV 160 may use its flaps 168 to reorient itself in a horizontal position, such that its fuselage 170 is closer to being aligned with the x-axis than the y-axis. Positioned horizontally, the propellers 166 may provide forward thrust so that the tail-sitter UAV 160 can fly in a similar manner as a typical airplane.

Many variations on the illustrated fixed-wing UAVs are possible. For instance, fixed-wing UAVs may include more or fewer propellers, and/or may utilize a ducted fan or multiple ducted fans for propulsion. Further, UAVs with more wings (e.g., an "x-wing" configuration with four wings), with fewer wings, or even with no wings, are also possible.

As noted above, some embodiments may involve other types of UAVs, in addition to or in the alternative to fixed-wing UAVs. For instance, FIG. 1E shows an example of a rotorcraft that is commonly referred to as a multicopter 180. The multicopter 180 may also be referred to as a quadcopter, as it includes four rotors 182. It should be understood that example embodiments may involve a rotorcraft with more or fewer rotors than the multicopter 180. For example, a helicopter typically has two rotors. Other examples with three or more rotors are possible as well. Herein, the term "multicopter" refers to any rotorcraft having more than two rotors, and the term "helicopter" refers to rotorcraft having two rotors.

Referring to the multicopter 180 in greater detail, the four rotors 182 provide propulsion and maneuverability for the multicopter 180. More specifically, each rotor 182 includes blades that are attached to a motor 184. Configured as such, the rotors 182 may allow the multicopter 180 to take off and land vertically, to maneuver in any direction, and/or to hover. Further, the pitch of the blades may be adjusted as a group and/or differentially, and may allow the multicopter 180 to control its pitch, roll, yaw, and/or altitude.

It should be understood that references herein to an "unmanned" aerial vehicle or UAV can apply equally to autonomous and semi-autonomous aerial vehicles. In an autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some embodiments, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator could control high level navigation decisions for a UAV, such as by specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and so on.

More generally, it should be understood that the example UAVs described herein are not intended to be limiting. Example embodiments may relate to, be implemented within, or take the form of any type of unmanned aerial vehicle.

III. ILLUSTRATIVE UAV COMPONENTS

Figure 2:
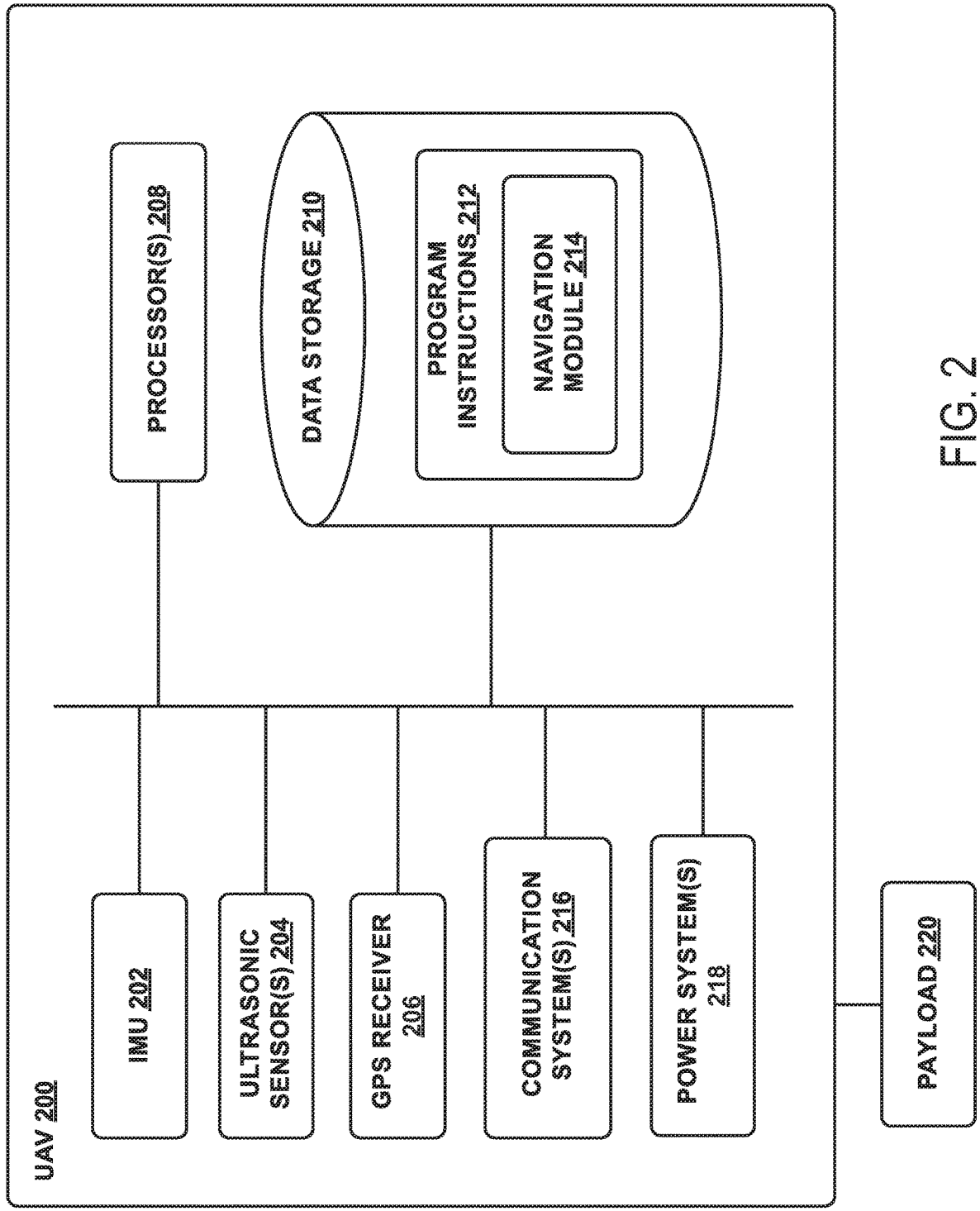
FIG. 2 is a simplified block diagram illustrating components of an unmanned aerial vehicle, according to an example embodiment.

FIG. 2 is a simplified block diagram illustrating components of a UAV 200, according to an example embodiment. UAV 200 may take the form of, or be similar in form to, one of the UAVs 100, 120, 140, 160, and 180 described in reference to FIGS. 1A-1E. However, UAV 200 may also take other forms.

UAV 200 may include various types of sensors, and may include a computing system configured to provide the functionality described herein. In the illustrated embodiment, the sensors of UAV 200 include an inertial measurement unit (IMU) 202, ultrasonic sensor(s) 204, and a GPS 206, among other possible sensors and sensing systems.

In the illustrated embodiment, UAV 200 also includes one or more processors 208. A processor 208 may be a general-purpose processor or a special purpose processor (e.g., digital signal processors, application specific integrated circuits, etc.). The one or more processors 208 can be configured to execute computer-readable program instructions 212 that are stored in the data storage 210 and are executable to provide the functionality of a UAV described herein.

The data storage 210 may include or take the form of one or more computer-readable storage media that can be read or accessed by at least one processor 208. The one or more computer-readable storage media can include volatile and/or non-volatile storage components, such as optical, magnetic, organic or other memory or disc storage, which can be integrated in whole or in part with at least one of the one or more processors 208. In some embodiments, the data storage 210 can be implemented using a single physical device (e.g., one optical, magnetic, organic or other memory or disc storage unit), while in other embodiments, the data storage 210 can be implemented using two or more physical devices.

As noted, the data storage 210 can include computer-readable program instructions 212 and perhaps additional data, such as diagnostic data of the UAV 200. As such, the data storage 210 may include program instructions 212 to perform or facilitate some or all of the UAV functionality described herein. For instance, in the illustrated embodiment, program instructions 212 include a navigation module 214 and a tether control module 216.

A. Sensors

In an illustrative embodiment, IMU 202 may include both an accelerometer and a gyroscope, which may be used together to determine an orientation of the UAV 200. In particular, the accelerometer can measure the orientation of the vehicle with respect to earth, while the gyroscope measures the rate of rotation around an axis. IMUs are commercially available in low-cost, low-power packages. For instance, an IMU 202 may take the form of or include a miniaturized MicroElectroMechanical System (MEMS) or a NanoElectroMechanical System (NEMS). Other types of IMUs may also be utilized.

An IMU 202 may include other sensors, in addition to accelerometers and gyroscopes, which may help to better determine position and/or help to increase autonomy of the UAV 200. Two examples of such sensors are magnetometers and pressure sensors. In some embodiments, a UAV may include a low-power, digital 3-axis magnetometer, which can be used to realize an orientation independent electronic compass for accurate heading information. However, other types of magnetometers may be utilized as well. Other examples are also possible. Further, note that a UAV could include some or all of the above-described inertia sensors as separate components from an IMU.

UAV 200 may also include a pressure sensor or barometer, which can be used to determine the altitude of the UAV 200. Alternatively, other sensors, such as sonic altimeters or radar altimeters, can be used to provide an indication of altitude, which may help to improve the accuracy of and/or prevent drift of an IMU.

In a further aspect, UAV 200 may include one or more sensors that allow the UAV to sense objects in the environment. For instance, in the illustrated embodiment, UAV 200 includes ultrasonic sensor(s) 204. Ultrasonic sensor(s) 204 can determine the distance to an object by generating sound waves and determining the time interval between transmission of the wave and receiving the corresponding echo off an object. A typical application of an ultrasonic sensor for unmanned vehicles or IMUs is low-level altitude control and obstacle avoidance. An ultrasonic sensor can also be used for vehicles that need to hover at a certain height or need to be capable of detecting obstacles. Other systems can be used to determine, sense the presence of, and/or determine the distance to nearby objects, such as a light detection and ranging (LIDAR) system, laser detection and ranging (LADAR) system, and/or an infrared or forward-looking infrared (FLIR) system, among other possibilities.

In some embodiments, UAV 200 may also include one or more imaging system(s). For example, one or more still and/or video cameras may be utilized by UAV 200 to capture image data from the UAV's environment. As a specific example, charge-coupled device (CCD) cameras or complementary metal-oxide-semiconductor (CMOS) cameras can be used with unmanned vehicles. Such imaging sensor(s) have numerous possible applications, such as obstacle avoidance, localization techniques, ground tracking for more accurate navigation (e,g., by applying optical flow techniques to images), video feedback, and/or image recognition and processing, among other possibilities.

UAV 200 may also include a GPS receiver 206. The GPS receiver 206 may be configured to provide data that is typical of well-known GPS systems, such as the GPS coordinates of the UAV 200. Such GPS data may be utilized by the UAV 200 for various functions. As such, the UAV may use its GPS receiver 206 to help navigate to the caller's location, as indicated, at least in part, by the GPS coordinates provided by their mobile device. Other examples are also possible.

B. Navigation and Location Determination

The navigation module 214 may provide functionality that allows the UAV 200 to, e.g., move about its environment and reach a desired location. To do so, the navigation module 214 may control the altitude and/or direction of flight by controlling the mechanical features of the UAV that affect flight (e.g., its rudder(s), elevator(s), aileron(s), and/or the speed of its propeller(s)).

In order to navigate the UAV 200 to a target location, the navigation module 214 may implement various navigation techniques, such as map-based navigation and localization-based navigation, for instance. With map-based navigation, the UAV 200 may be provided with a map of its environment, which may then be used to navigate to a particular location on the map. With localization-based navigation, the UAV 200 may be capable of navigating in an unknown environment using localization. Localization-based navigation may involve the UAV 200 building its own map of its environment and calculating its position within the map and/or the position of objects in the environment. For example, as a UAV 200 moves throughout its environment, the UAV 200 may continuously use localization to update its map of the environment. This continuous mapping process may be referred to as simultaneous localization and mapping (SLAM). Other navigation techniques may also be utilized.

In some embodiments, the navigation module 214 may navigate using a technique that relies on waypoints. In particular, waypoints are sets of coordinates that identify points in physical space. For instance, an air-navigation waypoint may be defined by a certain latitude, longitude, and altitude. Accordingly, navigation module 214 may cause UAV 200 to move from waypoint to waypoint, in order to ultimately travel to a final destination (e.g., a final waypoint in a sequence of waypoints).

In a further aspect, the navigation module 214 and/or other components and systems of the UAV 200 may be configured for "localization" to more precisely navigate to the scene of a target location. More specifically, it may be desirable in certain situations for a UAV to be within a threshold distance of the target location where a payload 228 is being delivered by a UAV (e.g., within a few feet of the target destination). To this end, a UAV may use a two-tiered approach in which it uses a more-general location-determination technique to navigate to a general area that is associated with the target location, and then use a more-refined location-determination technique to identify and/or navigate to the target location within the general area.

For example, the UAV 200 may navigate to the general area of a target destination where a payload 228 is being delivered using waypoints and/or map-based navigation. The UAV may then switch to a mode in which it utilizes a localization process to locate and travel to a more specific location. For instance, if the UAV 200 is to deliver a payload to a user's home, the UAV 200 may need to be substantially close to the target location in order to avoid delivery of the payload to undesired areas (e.g., onto a roof, into a pool, onto a neighbor's property, etc.). However, a GPS signal may only get the UAV 200 so far (e.g., within a block of the user's home). A more precise location-determination technique may then be used to find the specific target location.

Various types of location-determination techniques may be used to accomplish localization of the target delivery location once the UAV 200 has navigated to the general area of the target delivery location. For instance, the UAV 200 may be equipped with one or more sensory systems, such as, for example, ultrasonic sensors 204, infrared sensors (not shown), and/or other sensors, which may provide input that the navigation module 214 utilizes to navigate autonomously or semi-autonomously to the specific target location.

As another example, once the UAV 200 reaches the general area of the target delivery location (or of a moving subject such as a person or their mobile device), the UAV 200 may switch to a "fly-by-wire" mode where it is controlled, at least in part, by a remote operator, who can navigate the UAV 200 to the specific target location. To this end, sensory data from the UAV 200 may be sent to the remote operator to assist them in navigating the UAV 200 to the specific location.

As yet another example, the UAV 200 may include a module that is able to signal to a passer-by for assistance in either reaching the specific target delivery location; for example, the UAV 200 may display a visual message requesting such assistance in a graphic display, play an audio message or tone through speakers to indicate the need for such assistance, among other possibilities. Such a visual or audio message might indicate that assistance is needed in delivering the UAV 200 to a particular person or a particular location, and might provide information to assist the passer-by in delivering the UAV 200 to the person or location (e.g., a description or picture of the person or location, and/or the person or location's name), among other possibilities. Such a feature can be useful in a scenario in which the UAV is unable to use sensory functions or another location-determination technique to reach the specific target location. However, this feature is not limited to such scenarios.

In some embodiments, once the UAV 200 arrives at the general area of a target delivery location, the UAV 200 may utilize a beacon from a user's remote device (e.g., the user's mobile phone) to locate the person. Such a beacon may take various forms. As an example, consider the scenario where a remote device, such as the mobile phone of a person who requested a UAV delivery, is able to send out directional signals (e.g., via an RF signal, a light signal and/or an audio signal). In this scenario, the UAV 200 may be configured to navigate by "sourcing" such directional signals—in other words, by determining where the signal is strongest and navigating accordingly. As another example, a mobile device can emit a frequency, either in the human range or outside the human range, and the UAV 200 can listen for that frequency and navigate accordingly. As a related example, if the UAV 200 is listening for spoken commands, then the UAV 200 could utilize spoken statements, such as "I'm over here!" to source the specific location of the person requesting delivery of a payload.

In an alternative arrangement, a navigation module may be implemented at a remote computing device, which communicates wirelessly with the UAV 200. The remote computing device may receive data indicating the operational state of the UAV 200, sensor data from the UAV 200 that allows it to assess the environmental conditions being experienced by the UAV 200, and/or location information for the UAV 200. Provided with such information, the remote computing device may determine altitudinal and/or directional adjustments that should be made by the UAV 200 and/or may determine how the UAV 200 should adjust its mechanical features (e.g., its rudder(s), elevator(s), aileron(s), and/or the speed of its propeller(s)) in order to effectuate such movements. The remote computing system may then communicate such adjustments to the UAV 200 so it can move in the determined manner.

C. Communication Systems

In a further aspect, the UAV 200 includes one or more communication systems 218. The communications systems 218 may include one or more wireless interfaces and/or one or more wireline interfaces, which allow the UAV 200 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols.

Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network.

In some embodiments, a UAV 200 may include communication systems 218 that allow for both short-range communication and long-range communication. For example, the UAV 200 may be configured for short-range communications using Bluetooth and for long-range communications under a CDMA protocol. In such an embodiment, the UAV 200 may be configured to function as a "hot spot;" or in other words, as a gateway or proxy between a remote support device and one or more data networks, such as a cellular network and/or the Internet. Configured as such, the UAV 200 may facilitate data communications that the remote support device would otherwise be unable to perform by itself.

For example, the UAV 200 may provide a WiFi connection to a remote device, and serve as a proxy or gateway to a cellular service provider's data network, which the UAV might connect to under an LTE or a 3G protocol, for instance. The UAV 200 could also serve as a proxy or gateway to a high-altitude balloon network, a satellite network, or a combination of these networks, among others, which a remote device might not be able to otherwise access.

D. Power Systems

In a further aspect, the UAV 200 may include power system(s) 220. The power system 220 may include one or more batteries for providing power to the UAV 200. In one example, the one or more batteries may be rechargeable and each battery may be recharged via a wired connection between the battery and a power supply and/or via a wireless charging system, such as an inductive charging system that applies an external time-varying magnetic field to an internal battery.

E. Payload Delivery

The UAV 200 may employ various systems and configurations in order to transport and deliver a payload 228. In some implementations, the payload 228 of a given UAV 200 may include or take the form of a "package" designed to transport various goods to a target delivery location. For example, the UAV 200 can include a compartment, in which an item or items may be transported. Such a package may one or more food items, purchased goods, medical items, or any other object(s) having a size and weight suitable to be transported between two locations by the UAV. In other embodiments, a payload 228 may simply be the one or more items that are being delivered (e.g., without any package housing the items).

In some embodiments, the payload 228 may be attached to the UAV and located substantially outside of the UAV during some or all of a flight by the UAV. For example, the package may be tethered or otherwise releasably attached below the UAV during flight to a target location. In an embodiment where a package carries goods below the UAV, the package may include various features that protect its contents from the environment, reduce aerodynamic drag on the system, and prevent the contents of the package from shifting during UAV flight.

For instance, when the payload 228 takes the form of a package for transporting items, the package may include an outer shell constructed of water-resistant cardboard, plastic, or any other lightweight and water-resistant material. Further, in order to reduce drag, the package may feature smooth surfaces with a pointed front that reduces the frontal cross-sectional area. Further, the sides of the package may taper from a wide bottom to a narrow top, which allows the package to serve as a narrow pylon that reduces interference effects on the wing(s) of the UAV. This may move some of the frontal area and volume of the package away from the wing(s) of the UAV, thereby preventing the reduction of lift on the wing(s) cause by the package. Yet further, in some embodiments, the outer shell of the package may be constructed from a single sheet of material in order to reduce air gaps or extra material, both of which may increase drag on the system. Additionally or alternatively, the package may include a stabilizer to dampen package flutter. This reduction in flutter may allow the package to have a less rigid connection to the UAV and may cause the contents of the package to shift less during flight.

In order to deliver the payload, the UAV may include a winch system 221 controlled by the tether control module 216 in order to lower the payload 228 to the ground while the UAV hovers above. As shown in FIG. 2, the winch system 221 may include a tether 224, and the tether 224 may be coupled to the payload 228 by a payload coupling apparatus 226. The tether 224 may be wound on a spool that is coupled to a motor 222 of the UAV. The motor 222 may take the form of a DC motor (e.g., a servo motor) that can be actively controlled by a speed controller. The tether control module 216 can control the speed controller to cause the motor 222 to rotate the spool, thereby unwinding or retracting the tether 224 and lowering or raising the payload coupling apparatus 226. In practice, the speed controller may output a desired operating rate (e.g., a desired RPM) for the spool, which may correspond to the speed at which the tether 224 and payload 228 should be lowered towards the ground. The motor 222 may then rotate the spool so that it maintains the desired operating rate.

In order to control the motor 222 via the speed controller, the tether control module 216 may receive data from a speed sensor (e.g., an encoder) configured to convert a mechanical position to a representative analog or digital signal. In particular, the speed sensor may include a rotary encoder that may provide information related to rotary position (and/or rotary movement) of a shaft of the motor or the spool coupled to the motor, among other possibilities. Moreover, the speed sensor may take the form of an absolute encoder and/or an incremental encoder, among others. So in an example implementation, as the motor 222 causes rotation of the spool, a rotary encoder may be used to measure this rotation. In doing so, the rotary encoder may be used to convert a rotary position to an analog or digital electronic signal used by the tether control module 216 to determine the amount of rotation of the spool from a fixed reference angle and/or to an analog or digital electronic signal that is representative of a new rotary position, among other options. Other examples are also possible.

Based on the data from the speed sensor, the tether control module 216 may determine a rotational speed of the motor 222 and/or the spool and responsively control the motor 222 (e.g., by increasing or decreasing an electrical current supplied to the motor 222) to cause the rotational speed of the motor 222 to match a desired speed. When adjusting the motor current, the magnitude of the current adjustment may be based on a proportional-integral-derivative (PID) calculation using the determined and desired speeds of the motor 222. For instance, the magnitude of the current adjustment may be based on a present difference, a past difference (based on accumulated error over time), and a future difference (based on current rates of change) between the determined and desired speeds of the spool.

In some embodiments, the tether control module 216 may vary the rate at which the tether 224 and payload 228 are lowered to the ground. For example, the speed controller may change the desired operating rate according to a variable deployment-rate profile and/or in response to other factors in order to change the rate at which the payload 228 descends toward the ground. To do so, the tether control module 216 may adjust an amount of braking or an amount of friction that is applied to the tether 224. For example, to vary the tether deployment rate, the UAV 200 may include friction pads that can apply a variable amount of pressure to the tether 224. As another example, the UAV 200 can include a motorized braking system that varies the rate at which the spool lets out the tether 224. Such a braking system may take the form of an electromechanical system in which the motor 222 operates to slow the rate at which the spool lets out the tether 224. Further, the motor 222 may vary the amount by which it adjusts the speed (e.g., the RPM) of the spool, and thus may vary the deployment rate of the tether 224. Other examples are also possible.

In some embodiments, the tether control module 216 may be configured to limit the motor current supplied to the motor 222 to a maximum value. With such a limit placed on the motor current, there may be situations where the motor 222 cannot operate at the desired operate specified by the speed controller. For instance, as discussed in more detail below, there may be situations where the speed controller specifies a desired operating rate at which the motor 222 should retract the tether 224 toward the UAV 200, but the motor current may be limited such that a large enough downward force on the tether 224 would counteract the retracting force of the motor 222 and cause the tether 224 to unwind instead. And as further discussed below, a limit on the motor current may be imposed and/or altered depending on an operational state of the UAV 200.

In some embodiments, the tether control module 216 may be configured to determine a status of the tether 224 and/or the payload 228 based on the amount of current supplied to the motor 222. For instance, if a downward force is applied to the tether 224 (e.g., if the payload 228 is attached to the tether 224 or if the tether 224 gets snagged on an object when retracting toward the UAV 200), the tether control module 216 may need to increase the motor current in order to cause the determined rotational speed of the motor 222 and/or spool to match the desired speed. Similarly, when the downward force is removed from the tether 224 (e.g., upon delivery of the payload 228 or removal of a tether snag), the tether control module 216 may need to decrease the motor current in order to cause the determined rotational speed of the motor 222 and/or spool to match the desired speed. As such, the tether control module 216 may, based on the current supplied to the motor 222, determine if the payload 228 is attached to the tether 224, if someone or something is pulling on the tether 224, and/or if the payload coupling apparatus 226 is pressing against the UAV 200 after retracting the tether 224. Other examples are possible as well.

During delivery of the payload 228, the payload coupling apparatus 226 can be configured to secure the payload 228 while being lowered from the UAV by the tether 224, and can be further configured to release the payload 228 upon reaching ground level. The payload coupling apparatus 226 can then be retracted to the UAV by reeling in the tether 224 using the motor 222.

In some implementations, the payload 228 may be passively released once it is lowered to the ground. For example, a passive release mechanism may include one or more swing arms adapted to retract into and extend from a housing. An extended swing arm may form a hook on which the payload 228 may be attached. Upon lowering the release mechanism and the payload 228 to the ground via a tether, a gravitational force as well as a downward inertial force on the release mechanism may cause the payload 228 to detach from the hook allowing the release mechanism to be raised upwards toward the UAV. The release mechanism may further include a spring mechanism that biases the swing arm to retract into the housing when there are no other external forces on the swing arm. For instance, a spring may exert a force on the swing arm that pushes or pulls the swing arm toward the housing such that the swing arm retracts into the housing once the weight of the payload 228 no longer forces the swing arm to extend from the housing. Retracting the swing arm into the housing may reduce the likelihood of the release mechanism snagging the payload 228 or other nearby objects when raising the release mechanism toward the UAV upon delivery of the payload 228.

Active payload release mechanisms are also possible. For example, sensors such as a barometric pressure based altimeter and/or accelerometers may help to detect the position of the release mechanism (and the payload) relative to the ground. Data from the sensors can be communicated back to the UAV and/or a control system over a wireless link and used to help in determining when the release mechanism has reached ground level (e.g., by detecting a measurement with the accelerometer that is characteristic of ground impact). In other examples, the UAV may determine that the payload has reached the ground based on a weight sensor detecting a threshold low downward force on the tether and/or based on a threshold low measurement of power drawn by the winch when lowering the payload.

Other systems and techniques for delivering a payload, in addition or in the alternative to a tethered delivery system are also possible. For example, a UAV 200 could include an air-bag drop system or a parachute drop system. Alternatively, a UAV 200 carrying a payload could simply land on the ground at a delivery location. Other examples are also possible.

IV. ILLUSTRATIVE UAV DEPLOYMENT SYSTEMS

UAV systems may be implemented in order to provide various UAV-related services. In particular, UAVs may be provided at a number of different launch sites that may be in communication with regional and/or central control systems. Such a distributed UAV system may allow UAVs to be quickly deployed to provide services across a large geographic area (e.g., that is much larger than the flight range of any single UAV). For example, UAVs capable of carrying payloads may be distributed at a number of launch sites across a large geographic area (possibly even throughout an entire country, or even worldwide), in order to provide on-demand transport of various items to locations throughout the geographic area. FIG. 3 is a simplified block diagram illustrating a distributed UAV system 300, according to an example embodiment.

In the illustrative UAV system 300, an access system 302 may allow for interaction with, control of, and/or utilization of a network of UAVs 304. In some embodiments, an access system 302 may be a computing system that allows for human-controlled dispatch of UAVs 304. As such, the control system may include or otherwise provide a user interface through which a user can access and/or control the UAVs 304.

In some embodiments, dispatch of the UAVs 304 may additionally or alternatively be accomplished via one or more automated processes. For instance, the access system 302 may dispatch one of the UAVs 304 to transport a payload to a target location, and the UAV may autonomously navigate to the target location by utilizing various on-board sensors, such as a GPS receiver and/or other various navigational sensors.

Further, the access system 302 may provide for remote operation of a UAV. For instance, the access system 302 may allow an operator to control the flight of a UAV via its user interface. As a specific example, an operator may use the access system 302 to dispatch a UAV 304 to a target location. The UAV 304 may then autonomously navigate to the general area of the target location. At this point, the operator may use the access system 302 to take control of the UAV 304 and navigate the UAV to the target location (e.g., to a particular person to whom a payload is being transported). Other examples of remote operation of a UAV are also possible.

In an illustrative embodiment, the UAVs 304 may take various forms. For example, each of the UAVs 304 may be a UAV such as those illustrated in FIGS. 1A-1E. However, UAV system 300 may also utilize other types of UAVs without departing from the scope of the invention. In some implementations, all of the UAVs 304 may be of the same or a similar configuration. However, in other implementations, the UAVs 304 may include a number of different types of UAVs. For instance, the UAVs 304 may include a number of types of UAVs, with each type of UAV being configured for a different type or types of payload delivery capabilities.

The UAV system 300 may further include a remote device 306, which may take various forms. Generally, the remote device 306 may be any device through which a direct or indirect request to dispatch a UAV can be made. (Note that an indirect request may involve any communication that may be responded to by dispatching a UAV, such as requesting a package delivery). In an example embodiment, the remote device 306 may be a mobile phone, tablet computer, laptop computer, personal computer, or any network-connected computing device. Further, in some instances, the remote device 306 may not be a computing device. As an example, a standard telephone, which allows for communication via plain old telephone service (POTS), may serve as the remote device 306. Other types of remote devices are also possible.

Further, the remote device 306 may be configured to communicate with access system 302 via one or more types of communication network(s) 308. For example, the remote device 306 may communicate with the access system 302 (or a human operator of the access system 302) by communicating over a POTS network, a cellular network, and/or a data network such as the Internet. Other types of networks may also be utilized.

In some embodiments, the remote device 306 may be configured to allow a user to request delivery of one or more items to a desired location. For example, a user could request UAV delivery of a package to their home via their mobile phone, tablet, or laptop. As another example, a user could request dynamic delivery to wherever they are located at the time of delivery. To provide such dynamic delivery, the UAV system 300 may receive location information (e.g., GPS coordinates, etc.) from the user's mobile phone, or any other device on the user's person, such that a UAV can navigate to the user's location (as indicated by their mobile phone).

In an illustrative arrangement, the central dispatch system 310 may be a server or group of servers, which is configured to receive dispatch messages requests and/or dispatch instructions from the access system 302. Such dispatch messages may request or instruct the central dispatch system 310 to coordinate the deployment of UAVs to various target locations. The central dispatch system 310 may be further configured to route such requests or instructions to one or more local dispatch systems 312. To provide such functionality, the central dispatch system 310 may communicate with the access system 302 via a data network, such as the Internet or a private network that is established for communications between access systems and automated dispatch systems.

In the illustrated configuration, the central dispatch system 310 may be configured to coordinate the dispatch of UAVs 304 from a number of different local dispatch systems 312. As such, the central dispatch system 310 may keep track of which UAVs 304 are located at which local dispatch systems 312, which UAVs 304 are currently available for deployment, and/or which services or operations each of the UAVs 304 is configured for (in the event that a UAV fleet includes multiple types of UAVs configured for different services and/or operations). Additionally or alternatively, each local dispatch system 312 may be configured to track which of its associated UAVs 304 are currently available for deployment and/or are currently in the midst of item transport.

In some cases, when the central dispatch system 310 receives a request for UAV-related service (e.g., transport of an item) from the access system 302, the central dispatch system 310 may select a specific UAV 304 to dispatch. The central dispatch system 310 may accordingly instruct the local dispatch system 312 that is associated with the selected UAV to dispatch the selected UAV. The local dispatch system 312 may then operate its associated deployment system 314 to launch the selected UAV. In other cases, the central dispatch system 310 may forward a request for a UAV-related service to a local dispatch system 312 that is near the location where the support is requested and leave the selection of a particular UAV 304 to the local dispatch system 312.

In an example configuration, the local dispatch system 312 may be implemented as a computing system at the same location as the deployment system(s) 314 that it controls. For example, the local dispatch system 312 may be implemented by a computing system installed at a building, such as a warehouse, where the deployment system(s) 314 and UAV(s) 304 that are associated with the particular local dispatch system 312 are also located. In other embodiments, the local dispatch system 312 may be implemented at a location that is remote to its associated deployment system(s) 314 and UAV(s) 304.

Numerous variations on and alternatives to the illustrated configuration of the UAV system 300 are possible. For example, in some embodiments, a user of the remote device 306 could request delivery of a package directly from the central dispatch system 310. To do so, an application may be implemented on the remote device 306 that allows the user to provide information regarding a requested delivery, and generate and send a data message to request that the UAV system 300 provide the delivery. In such an embodiment, the central dispatch system 310 may include automated functionality to handle requests that are generated by such an application, evaluate such requests, and, if appropriate, coordinate with an appropriate local dispatch system 312 to deploy a UAV.

Further, some or all of the functionality that is attributed herein to the central dispatch system 310, the local dispatch system(s) 312, the access system 302, and/or the deployment system(s) 314 may be combined in a single system, implemented in a more complex system, and/or redistributed among the central dispatch system 310, the local dispatch system(s) 312, the access system 302, and/or the deployment system(s) 314 in various ways.

Yet further, while each local dispatch system 312 is shown as having two associated deployment systems 314, a given local dispatch system 312 may alternatively have more or fewer associated deployment systems 314. Similarly, while the central dispatch system 310 is shown as being in communication with two local dispatch systems 312, the central dispatch system 310 may alternatively be in communication with more or fewer local dispatch systems 312.

In a further aspect, the deployment systems 314 may take various forms. In general, the deployment systems 314 may take the form of or include systems for physically launching one or more of the UAVs 304. Such launch systems may include features that provide for an automated UAV launch and/or features that allow for a human-assisted UAV launch. Further, the deployment systems 314 may each be configured to launch one particular UAV 304, or to launch multiple UAVs 304.

The deployment systems 314 may further be configured to provide additional functions, including for example, diagnostic-related functions such as verifying system functionality of the UAV, verifying functionality of devices that are housed within a UAV (e.g., a payload delivery apparatus), and/or maintaining devices or other items that are housed in the UAV (e.g., by monitoring a status of a payload such as its temperature, weight, etc.).

In some embodiments, the deployment systems 314 and their corresponding UAVs 304 (and possibly associated local dispatch systems 312) may be strategically distributed throughout an area such as a city. For example, the deployment systems 314 may be strategically distributed such that each deployment system 314 is proximate to one or more payload pickup locations (e.g., near a restaurant, store, or warehouse). However, the deployment systems 314 (and possibly the local dispatch systems 312) may be distributed in other ways, depending upon the particular implementation. As an additional example, kiosks that allow users to transport packages via UAVs may be installed in various locations. Such kiosks may include UAV launch systems, and may allow a user to provide their package for loading onto a UAV and pay for UAV shipping services, among other possibilities. Other examples are also possible.

In a further aspect, the UAV system 300 may include or have access to a user-account database 316. The user-account database 316 may include data for a number of user accounts, and which are each associated with one or more person. For a given user account, the user-account database 316 may include data related to or useful in providing UAV-related services. Typically, the user data associated with each user account is optionally provided by an associated user and/or is collected with the associated user's permission.

Further, in some embodiments, a person may be required to register for a user account with the UAV system 300, if they wish to be provided with UAV-related services by the UAVs 304 from UAV system 300. As such, the user-account database 316 may include authorization information for a given user account (e.g., a user name and password), and/or other information that may be used to authorize access to a user account.

In some embodiments, a person may associate one or more of their devices with their user account, such that they can access the services of UAV system 300. For example, when a person uses an associated mobile phone, e.g., to place a call to an operator of the access system 302 or send a message requesting a UAV-related service to a dispatch system, the phone may be identified via a unique device identification number, and the call or message may then be attributed to the associated user account. Other examples are also possible.

V. ILLUSTRATIVE TOTE PACKAGE

Figure 4A:
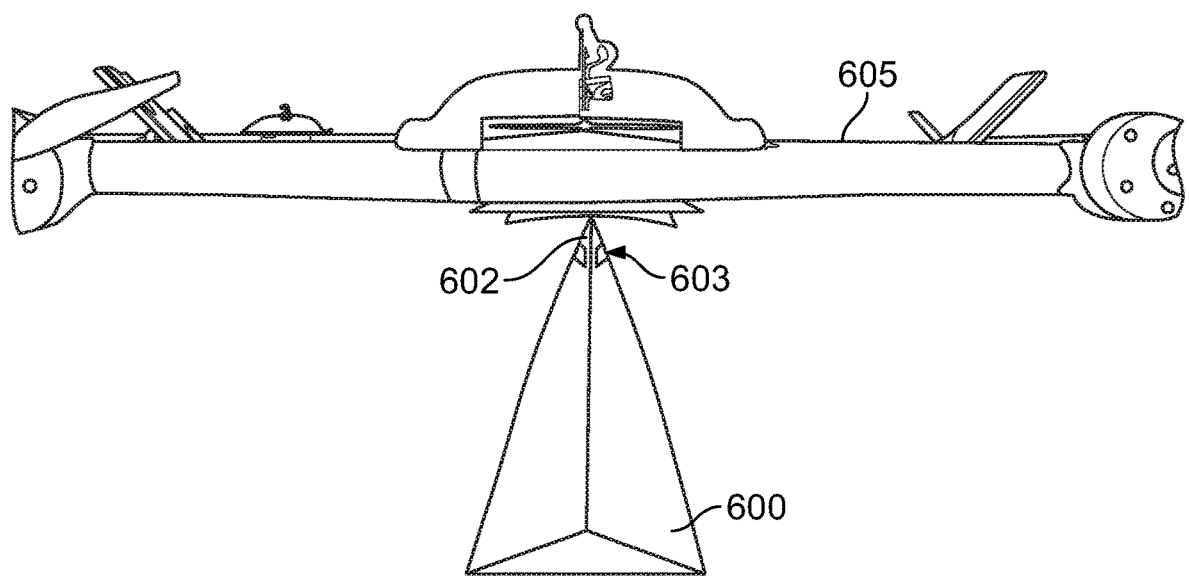
FIGS. 4A, 4B, 4C, and 4D illustrate various view of a tote package connected to an unmanned aerial vehicle, according to an example embodiment.
Figure 4B:
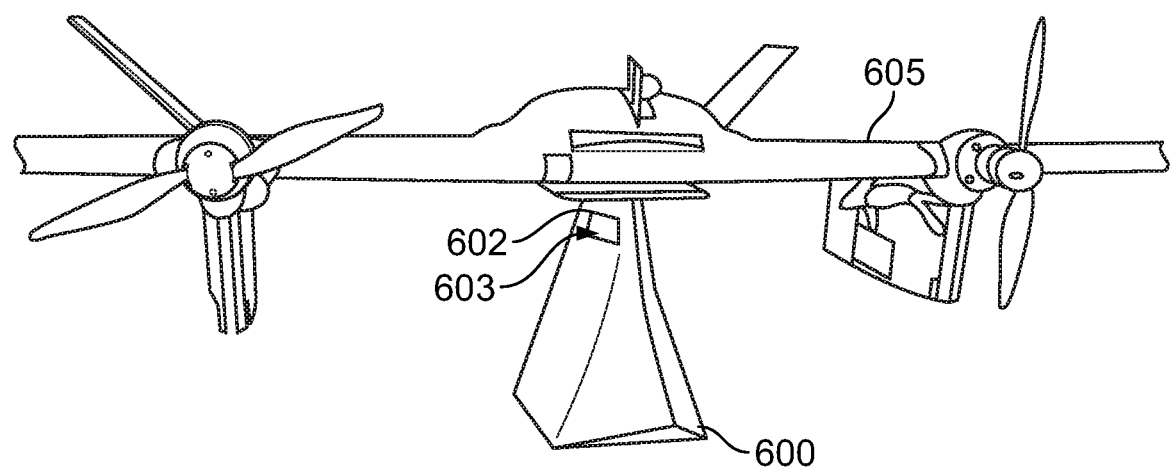
Figure 4C:
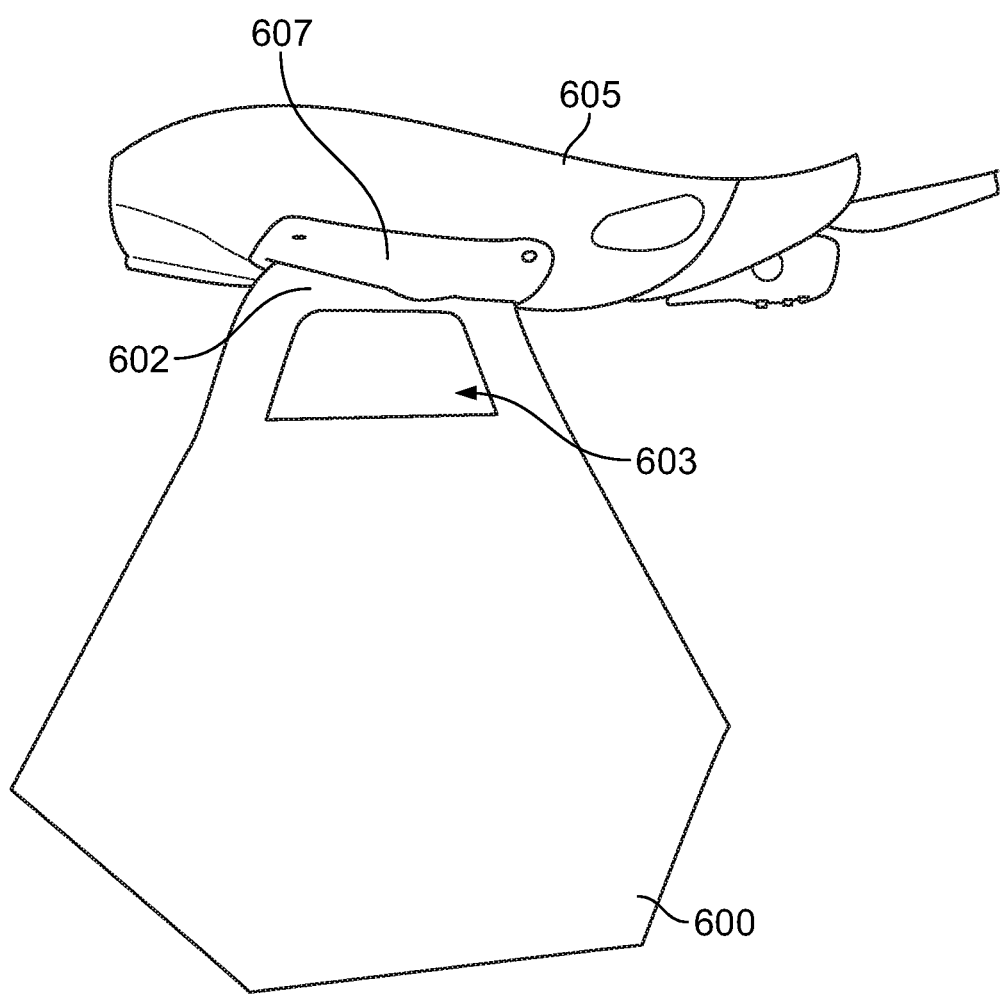
Figure 4D:
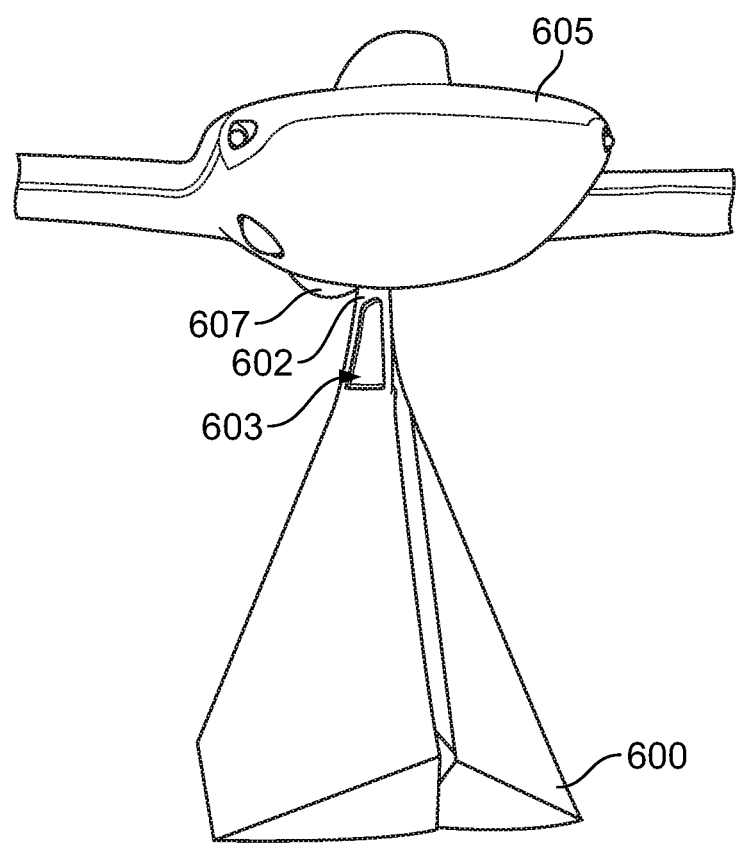

FIGS. 4A, 4B, 4C, and 4D display a tote package 600 attached to an aircraft 605. The tote package 600 may include a handle 602 and a handle opening 603. Additionally, the tote package 600 may be attached to an adapter 607 of the aircraft 605, as shown in FIGS. 4C and 4D. Although the tote package 600 in FIG. 4D may appear to have an open slit in the front, the tote package 600 may instead be closed in the front, such that there is a simple crease in the front of tote package 600. In some embodiments, more, fewer, and/or different components may be used to carry and deliver a tote package 600 using an aircraft 605.

Although aircraft 605 is shown as a UAV, other types of vehicles may be used to deliver the tote package 600, including aircrafts with one or more persons, other types of aircrafts, helicopters, boats, submarines, cars, trucks, and/or other vehicles. Although UAV 605 may be different from UAVs 1100a, 100, 200, 300, and 350, in other embodiments, aircraft 605 may be similar to and/or the same as UAVs 1100a, 100, 200, 300, and 350 described earlier. Further, one or more aircrafts 605 may be deployed by the various systems displayed and/or described in FIG. 3 to deliver packages, such as tote package 600. Additionally, aircraft 605 may include some or all of the components described in FIG. 2 for UAV 200.

In the displayed embodiments of FIGS. 4A, 4B, 4C, and 4D, the tote package 600 can be used for the application of delivering a package with a UAV, such as UAV 605. Although a UAV can deliver a package that is stored within the UAV, it may be preferred, in some cases, to deliver a package that is located external to a UAV. By delivering a package, such as tote package 600, that is external to the UAV 605, the aircraft can improve efficiency by reducing fuel costs.

For example, a smaller UAV can be used because the UAV doesn't have to be large enough to contain the tote package 600 within the UAV 605. By using the smaller UAV, the fuel costs and transportation costs may be reduced and the efficiency of the delivery of the package may be improved. Using the tote package 600 to deliver goods external to a UAV can be useful for any application where efficiency is important. Thus, the tote package 600 may be used for short distance deliveries, long-distance deliveries, deliveries with different types of UAVs, or any type of delivery where fuel costs, costs of delivery, and/or efficiency are important.

The tote package 600 can be used in applications where the UAV 605 carries the tote package 600 to the delivery site, releases the tote package 600, and flies without the package to somewhere other than the delivery site (such as the original departure location, or some other location). Because the UAV can release the tote package with its contents, the UAV requires less fuel for flight after delivery than a UAV that merely releases the contents of the package and continues to fly with the empty package to another location (such as the original departure location, or some location other than the delivery site). Thus, the tote package 600 can also encourage efficient package delivery by being released at the delivery site from the aircraft 605.

The tote package 600 is attached to the aircraft 605 at adapter 607, which is part of the aircraft 605. The adapter 607 may allow for a rigid attachment of the tote package 600 to the aircraft 605 at a fixed point, such as at the adapter 607. The rigid attachment at a fixed point may prevent shifting of the tote package 600 and the contents within the package. Reducing shifting of the package and its contents may improve flight dynamics of the aircraft 605. Thus, the adapter 607 can improve flight dynamics of the aircraft 605 with the tote package 600, which may reduce fuel costs and improve efficiency of delivery of the package 600 by aircraft 605.

In some embodiments, attachments different from the adapter 607 may be used to attach the tote package 600 to the aircraft 605. Furthermore, in other embodiments, the attachment may be at multiple points of the aircraft 605 and/or tote package 600. Further, the attachment of the package 600 to the aircraft 605 may not be rigid, in some embodiments. Other examples of attaching the tote package 600 to the aircraft 605 are also possible.

The aircraft 605 may use a variety of systems and methods to release the tote package 600 from the aircraft 605 upon delivery of the tote package 600 to the delivery site. One example may include using a winch connected to the tote package 600. The attachment could be at a location aligned with the center of mass of the tote package 600. Alternatively, the attachment could be at multiple points of the tote package. Other mechanisms for releasing the tote package 600 may be used.

Figure 5A:
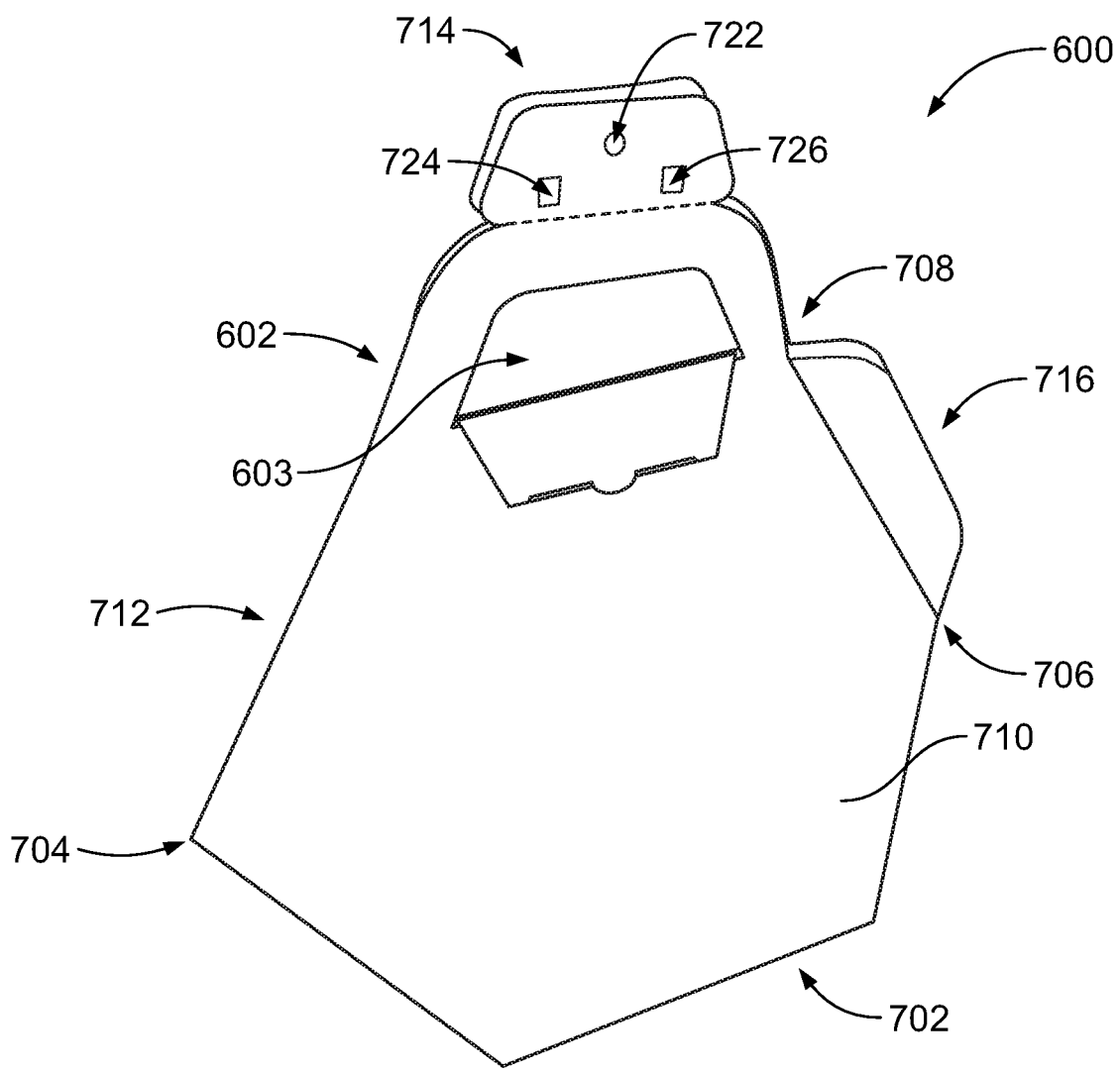
FIG. 5A illustrates a perspective view of a tote package, according to an example embodiment.

FIG. 5A displays the tote package 600 in a folded configuration. The tote package 600 may include a handle 602 and handle opening 603. The tote package 600 may also include a bottom portion 702, a front portion 704, a back portion 706, a top portion 708, a first side portion 710, a second side portion 712, a tote package vehicle connector 714, and a tote package vertical stabilizer 716. The vehicle connector 714 may include a hole 722, a first square opening 724, and a second square opening 726. In other embodiments, the tote package 600 may include more, fewer, and/or different components.

The tote package 600 may have a more aerodynamic design than other packages to provide more efficient package delivery with the UAV when the tote package 600 is located external to the UAV. The design of the tote package 600 may improve UAV delivery of goods in several ways. First, the design of the tote package may reduce drag incurred during and after delivery. Second, the design of the tote package may reduce interference effects with airflow around the wing(s) of the UAV. In particular, the design of the tote package may prevent a reduction of lift on the wing(s) of the UAV. Additionally, the tote package 600 may be designed to prevent shifting of the tote package and the contents of the tote package during UAV flight.

The tote package 600 may be designed to reduce drag incurred by the tote package, and thus the system of the UAV carrying the tote package. Drag may be the resistance force incurred by the package and/or vehicle during motion through a fluid (such as air for a UAV and an attached package in motion). Various factors can affect drag. In particular, smooth surfaces, fewer surfaces, and a lower amount of frontal cross-sectional area are design factors that can reduce the drag incurred by a package and/or the vehicle. Other factors that may affect drag include speed, air gaps, excess material, the size of the vehicle, lift, and/or other factors.

The front portion 704 may be designed to reduce drag by having a pointed front end design. The pointed front end design can reduce the frontal cross-sectional area of the tote package 600, which lowers the drag on the tote package 600. Additionally, the design of the front portion 704 could be round or have a pointed leading edge to reduce drag by reducing the frontal cross-sectional area. A rounded front portion design may work better for a larger range of angles of attack, while a pointed leading edge (or pointed) front portion may be more efficient for a smaller range of angles of attack.

Thus, if the attack angle of the tote package is known, a pointed front portion 704, or pointed leading edge, may be a more efficient design than a rounded front portion. Alternatively, if the tote package 600 may have a large range of angles of attack, then a rounded front portion 704 may be more efficient than a pointed front portion 704, or pointed leading edge. In the displayed embodiments, the front portion 704 of the tote package 700 is a pointed edge design to more efficiently reduce drag at a particular range of angles of attack for the tote package 600. Other designs of the front portion 704 may be possible.

Smooth surfaces of the tote package 600 can also help reduce drag. In particular, the first side portion 710, second side portion 712, and bottom portion 702 may all have smooth exterior surfaces along the tote package 600. Put differently, each of these portions may be mostly flat. Additionally, folds and/or edges for portions 702, 710, and 712 may have little excess material and/or air gaps present that could increase drag on the tote package 600. Furthermore, each of these portions reduces the frontal cross-sectional area of the tote package 600, which in turn lowers drag.

The tote package 600 may be generated from one sheet of material (such as paper, cardboard, and/or other materials for packages) by folding, connecting, and/or sealing sections of the sheet of material. Using one sheet of material helps ensure that an aerodynamic and watertight tote package 600 can be generated. In particular, creating a tote package out of multiple sheets may be prone to air gaps and/or excess material at locations where one sheet of material is connected to another sheet of material. Both air gaps and excess material can increase drag, while air gaps may prevent the tote package from being watertight. Thus, generating the tote package 600 from one sheet of material can ensure an aerodynamic and/or watertight design.

The tote package 600 can be designed from less expensive materials (such as paper, cardboard, and/or other inexpensive materials) to allow the UAV to release both the contents of the tote package and the tote package itself at the delivery site. This allows any subsequent flights of the UAV to proceed without the added weight, frontal cross-sectional area, and/or volume of the tote package. In this way, the tote package 600 further reduces the drag on the UAV during flight before and after the delivery, which further reduces fuel costs.

The tote package 600 includes vehicle connector 714, which allows the tote package 600 to be released from the UAV 605 after delivery of the tote package 600 to the delivery site. The tote package 600 may detach from the connector 714 from above the handle 602. The connector 714 includes a hole 722, and square openings 724 and 726. The adapter 607 may include parts adapted to be inserted through the openings 722, 724, and 726 to attach the tote package 600 to the UAV 605 via the adapter 607 and vehicle connector 714 during UAV flight. In other embodiments, the vehicle connector 714 may include more, fewer, and/or different openings then openings 722, 724, and 726.

Although the tote package contains a handle 602 with a handle opening 603, in general, the tote package 600 may have few concave surfaces and/or openings that may increase drag. Furthermore, the handle 602 and handle opening 603 make the tote package 600 easier for a recipient to carry. Thus, if the handle 602 and/or handle opening 603 cause additional drag during delivery of the package 600, the trade-off of increased drag may be worth the improvement of a package 600 that is easier for the user to carry due to the handle 602 and handle opening 603.

The tote package 600 may also be designed to reduce interference effects on the airflow around the wing(s) of the UAV 605. In particular, the tote package 600 may be designed to prevent reductions of lift on the wing(s) of the UAV 605. Specifically, the tote package may be designed to have the frontal cross-sectional area and the volume of the package located further away from the wing(s) of the UAV 605. For example, the first side portion 710 and second side portion 712 may have a tapered design rising from the wide bottom portion 702 to the narrow top portion 714. In particular, the side portions 710 and 712 meet at the top portion 714 to create the handle 602 and vehicle connector 714. The top portion 714 may be significantly narrower than the bottom portion 702.

The tapering of side portions 710 and 712, as well as the narrow design of top portion 714, allows the tote package 600 to act as a narrow pylon that reduces interference effects on the wing. Specifically, the tapering portions 710 and 712 and narrow top portion 714 reduce and/or eliminate the air shadow that may be generated by tote package 600 on the wing(s) of the UAV 605. By reducing and/or eliminating the air shadow of tote package 600 on the wing(s) of the UAV 605, the tote package 600 may prevent reductions of lift for the wing(s) of the UAV 605 by the tote package 600. Thus, the narrow pylon design of the tote package 600 improves efficiency of the UAV 605 and reduces fuel costs.

The tote package 600 also includes a stabilizer 716 at the back portion 706 of the tote package. The vertical stabilizer 716 dampens the movement of the package during UAV flight. In particular, if the tote package 600 is not rigidly coupled to the UAV 605, the tote package 600 and its contents may shift during UAV flight. Thus, the vertical stabilizer can lessen movements of the tote package 600 during UAV flight to reduce shifting of the weight of the tote package 600 and the tote package contents during UAV flight.

Additionally, rigid mounting of the tote package 600 to the UAV can also reduce shifting of the tote package 600 and the tote package contents during UAV flight. The stabilizer 716 may also dampen movement of a package 600 rigidly attached to the UAV 605. By reducing the shifting of the tote package 600 and the tote package contents using a vertical stabilizer 716 and rigid mounting to the UAV 605, flight dynamics of the UAV 605 can be improved. This improvement may lower fuel costs and improve efficiency of the UAV.

Because the tote package 600 may be located external to the UAV 605 during flight, the tote package 600 may be designed to protect its contents from the outside environment. In particular, by using one sheet of material during folding and creation of the tote package 600, the tote package 600 may be watertight and have few air gaps. Additionally, the tote package may protect its contents from elements of the outside environment, including hot or cold temperature, moisture, dirt, insects, birds, objects, and or other items of the outside environment.

Because the tote package 600 is left at the delivery site, low cost materials and affordable methods may be used for creating the tote package 600. Materials may include paper, cardboard, and/or other materials typically used to manufacture bags, boxes, packages, and/or other items for shipping. The tote package 600 may be folded from the sheet of material without requiring the use of any additional, custom, and/or expensive tools. Alternatively, existing machines for making packages, boxes, bags, and/or other shipping materials may be used to create tote package 600. Furthermore, the sheet of material used to create tote package 600 may be flattened and stored for later use. Because the sheet of material can be flattened and stored, storage of the tote package prior to use may be relatively inexpensive and efficient for an entity (such as a box manufacturer, a shipping company, etc.).

The tote package may have more or fewer sides than the number of sides displayed in and/or described in the displayed embodiments. The tote package 600 may be sized to be larger or smaller depending on the contents of the package, and thus, may be scalable. Although the displayed embodiments show delivery of one tote package 600 for each UAV 605, in other embodiments, a UAV 605 may deliver multiple tote packages 600.

Figure 5B:
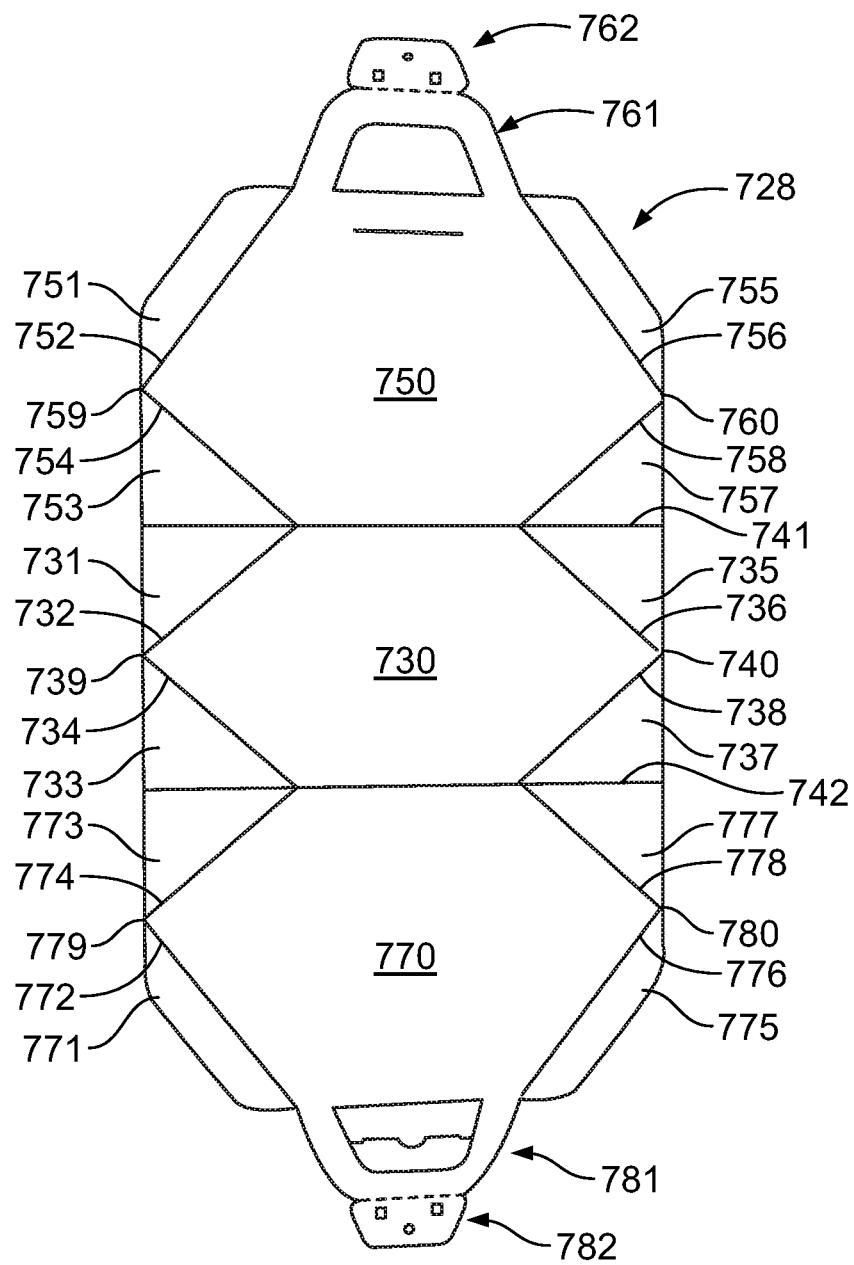
FIG. 5B illustrates a top view of a sheet of material, according to an example embodiment.

FIG. 5B displays a sheet of material 728 with one or more sections that are folded and/or sealed to create the tote package 600. The sheet 728 may include a first folding line 741 separating a middle section 730 from a first side section 750, and a second folding line 742 separating a second side section 770 from the middle section 730. The middle section 730 may include flaps 731, 733, 735, and 737, as well as corresponding flap lines 732, 734, 736, and 738, respectively. The middle section 730 may further include a first corner 739 and a second corner 740.

The first side section 750 may include flaps 751, 753, 755, and 757, as well as corresponding flap lines 752, 754, 756, and 758, respectively. The first side section 750 may further include a first corner 759 and a second corner 760, as well as a first handle section 761 and a first vehicle connector section 762. The second side section 770 may include flaps 771, 773, 775, and 777, as well as corresponding flap lines 772, 774, 776, and 778, respectively. The second side section 770 may further include a first corner 779 and a second corner 780, as well a second handle section 781 and a second vehicle connector section 782. The sheet of material 728 may include more, fewer, and/or different sections, flaps, flap lines, folding lines, and/or other components.

When the material 728 is folded into the tote package 600, the various sections and flaps may correspond to different portions of the tote package 600. For example, the middle section 730 may correspond to the bottom portion 702 when the sheet of material 728 is folded into the tote package 600. Additionally, the first side section 750 may correspond to the first side portion 710, while the second side section 770 may correspond to the second side portion 712 when the sheet 728 is folded into the package 600.

Furthermore, the top portion 714 may correspond to the parts of the first side section 750 and second side section 770 that meet when the sheet 728 is folded into the package 600. In particular, the top portion 714 may include handle 602 and vehicle connector 714. The handle 602 may include the first handle section 761 and the second handle section 781.

Also, the vehicle connector 714 may include the first vehicle connector section 762 and the second vehicle connector section 782.

The front portion 704 of the package 600 may correspond to the corners 739, 759, and 779 intersecting when the sheet 728 is folded. In particular, sections 730, 750, and 770 may be folded such that corners 739, 759, and 779 intersect to create the front portion 704. Additionally, the sheet 728 may be folded such that the corners 740, 760, and 780 also intersect to create the back portion 706 of the package 600. Furthermore, the back portion 706 may also include the stabilizer 716, which may be created by corresponding flaps in the side sections 750 and 770 being folded and sealed together. For example, in the displayed embodiments, flaps 755 and 775 can be folded together to create the stabilizer 716.

Additionally, the sheet of material 728 may be symmetrical and allow for different parts of the material 728 to correspond to different portions of the package 600. For example, the sheet of material may be symmetrical such that the back portion 706 can be generated by intersecting corners 739, 759, and 779. In this case, the stabilizer 716 may correspond to folding flaps 751 and 771 together. Because the sheet of material 728 may be symmetrical, the sheet of material 728 could be folded in different directions along the folding lines and flap lines to create the package 600.

Sheet 728 includes folding assistance in the form of folding lines 741 and 742, as well as flap lines 732, 734, 736, 738, 752, 754, 756, 758, 772, 774, 776, and 778. Folding assistance may be provided with the sheet of material 728 to make folding easier by requiring less force to fold the material 728 along the folding line or flap line. Folding line 741 is provided to make a fold between section 730 and 750 easier, while folding line 742 is provided to make a fold between section 730 and 770 easier. Furthermore, each flap line has a corresponding flap to make folding of the corresponding flap easier.

Folding assistance can lead to a more aerodynamic construction the package 600. In particular, easier folding leads to better folds, which may result in less bunched up and/or excess material on the external surfaces of the package 600 after folding. As a result, the folded package 600 is more aerodynamic due to the better folds provided by the folding assistance. Folding lines, flap lines, and/or other types of folding assistance, may be provided as creases, perforations, and/or other alterations or deformations of the material 728 to ease folding of the material. Folding assistance may be provided as a combination of one or more of the aforementioned types of alterations or deformations of the material 728. For example, a folding line may be provided as a combined crease and perforation. In other words, a creased folding line may also be perforated at the same spot where the folding line is creased. Alternatively, a folding line may have a portion that is creased and a different portion that is perforated. Other types of folding assistance may also be possible.

Figure 6A:
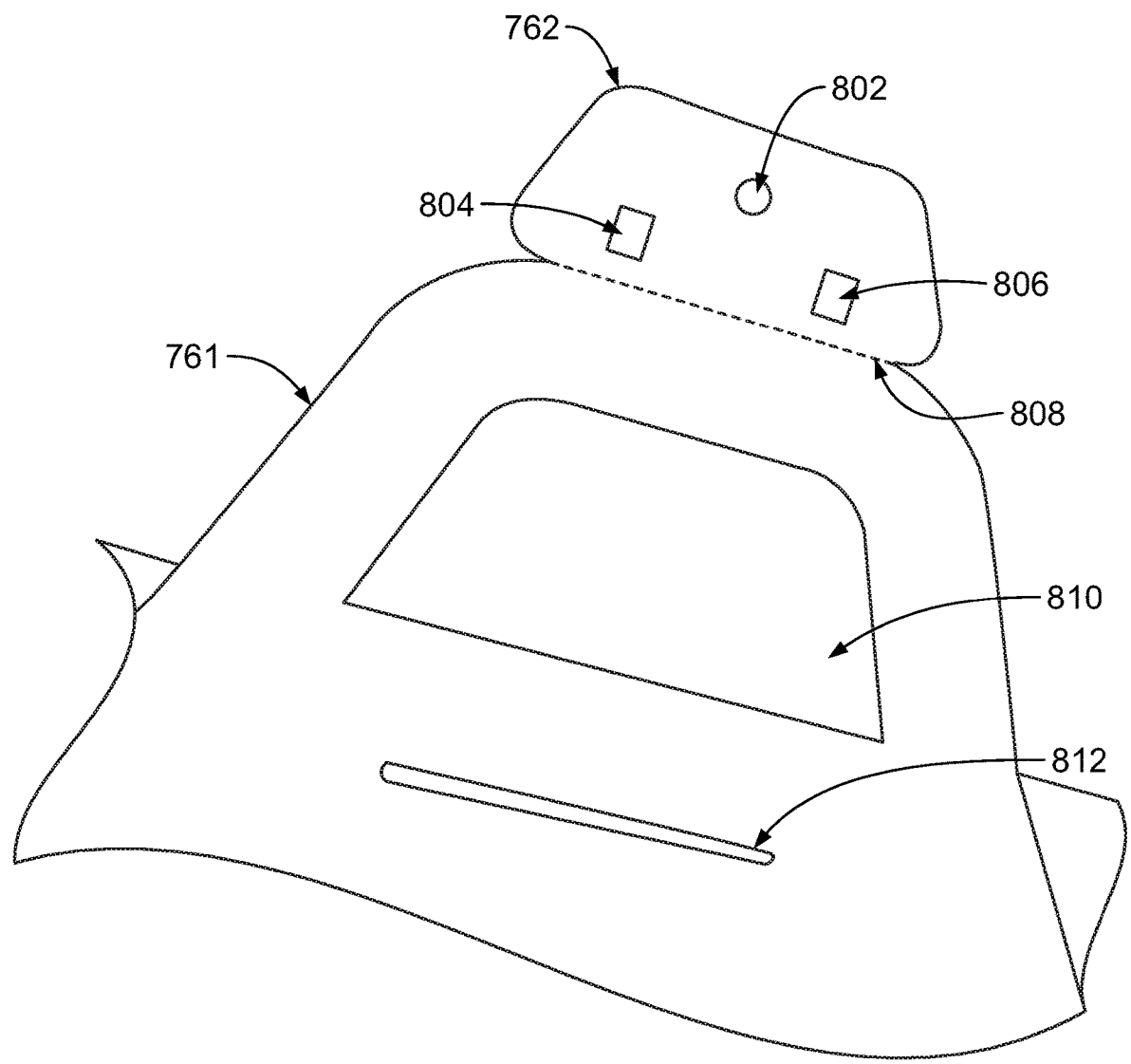
FIG. 6A illustrates a tope view of a portion of a handle, according to an example embodiment.
Figure 6B:
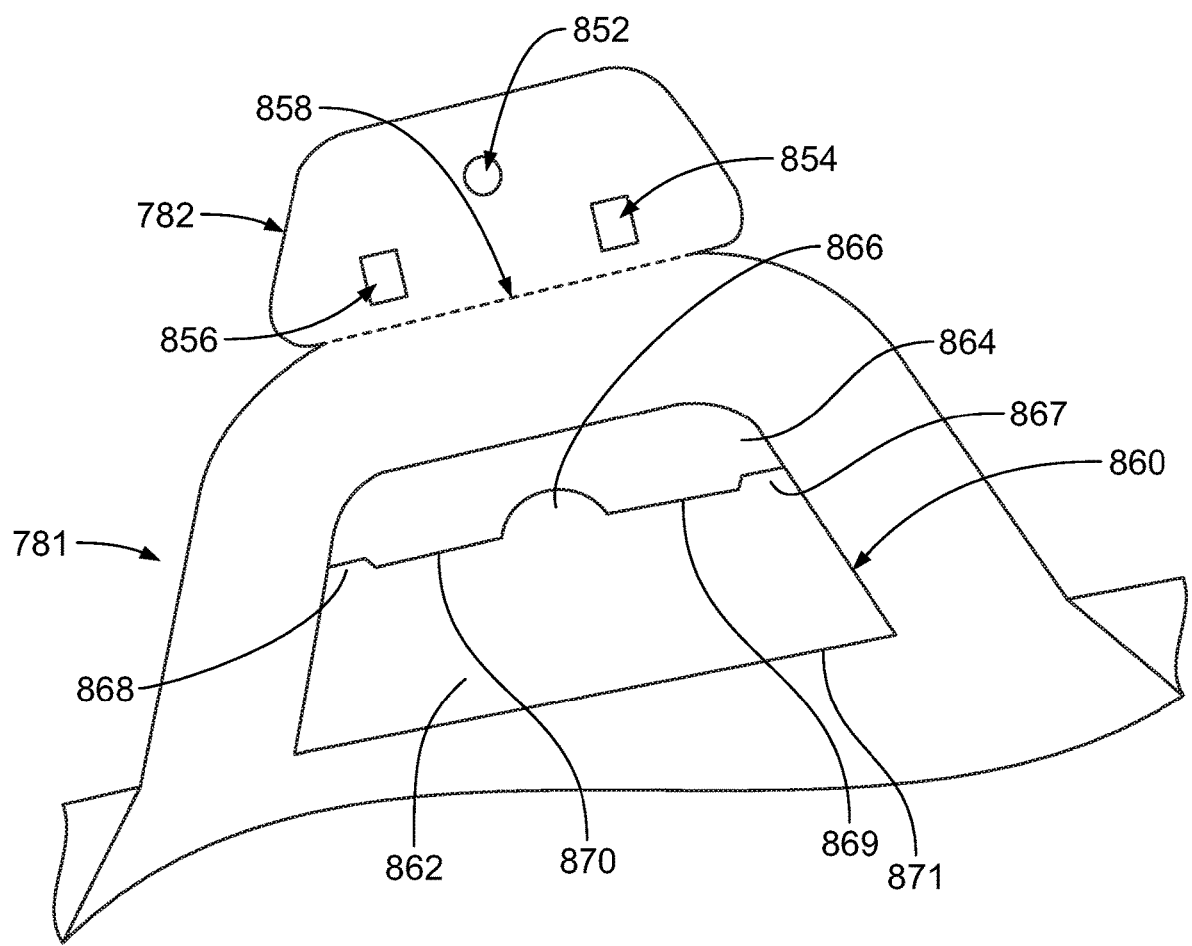
FIGS. 6B and 6C illustrate various views of another portion of the handle, according to an example embodiment.
Figure 6C:
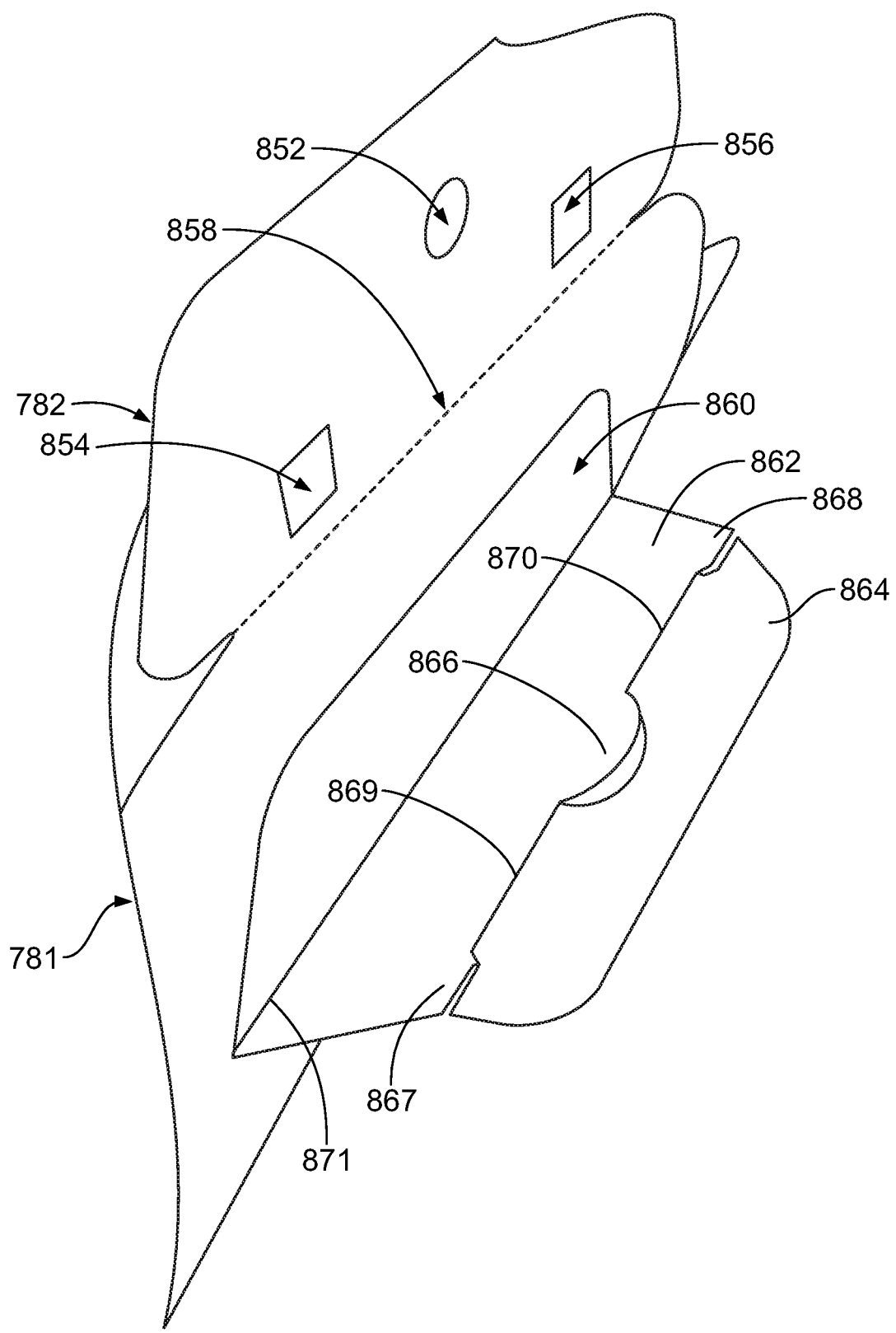

FIG. 6A displays a first handle section 761 and a first vehicle connector section 762 that can be separated at attachment line 808. The first vehicle connector section includes a hole 802 and square openings 804 and 806. The first handle section 761 includes a first handle section opening 810 as well as a handle flap notch 812. FIGS. 6B and 6C display a second handle section 781 and a second vehicle connector section 782 that can be separated at an attachment line 858. The second vehicle connector section 782 includes a hole 852 and square openings 854 and 856.

The second vehicle handle section 781 includes a second handle section opening 860, flaps 862 and 864, tabs 866, 867, and 868, as well as flap connections 869, 870, and 871. The handle sections and vehicle connector sections of FIGS. 6A, 6B, and 6C may include more, fewer, and/or different components than those described or displayed.

The flaps 862 and 864 allow the second vehicle handle section 762 to engage the first vehicle handle section 761 at the handle flap notch 812. Flap 864 is attached to flap 862 at flap connections 869 and 870. Further, tabs 866, 867, and 868 are detached from flap 864. This configuration allows the flaps 862 and 864 to engage the first vehicle handle section 761, as shown in FIG. 6D.

Figure 6D:
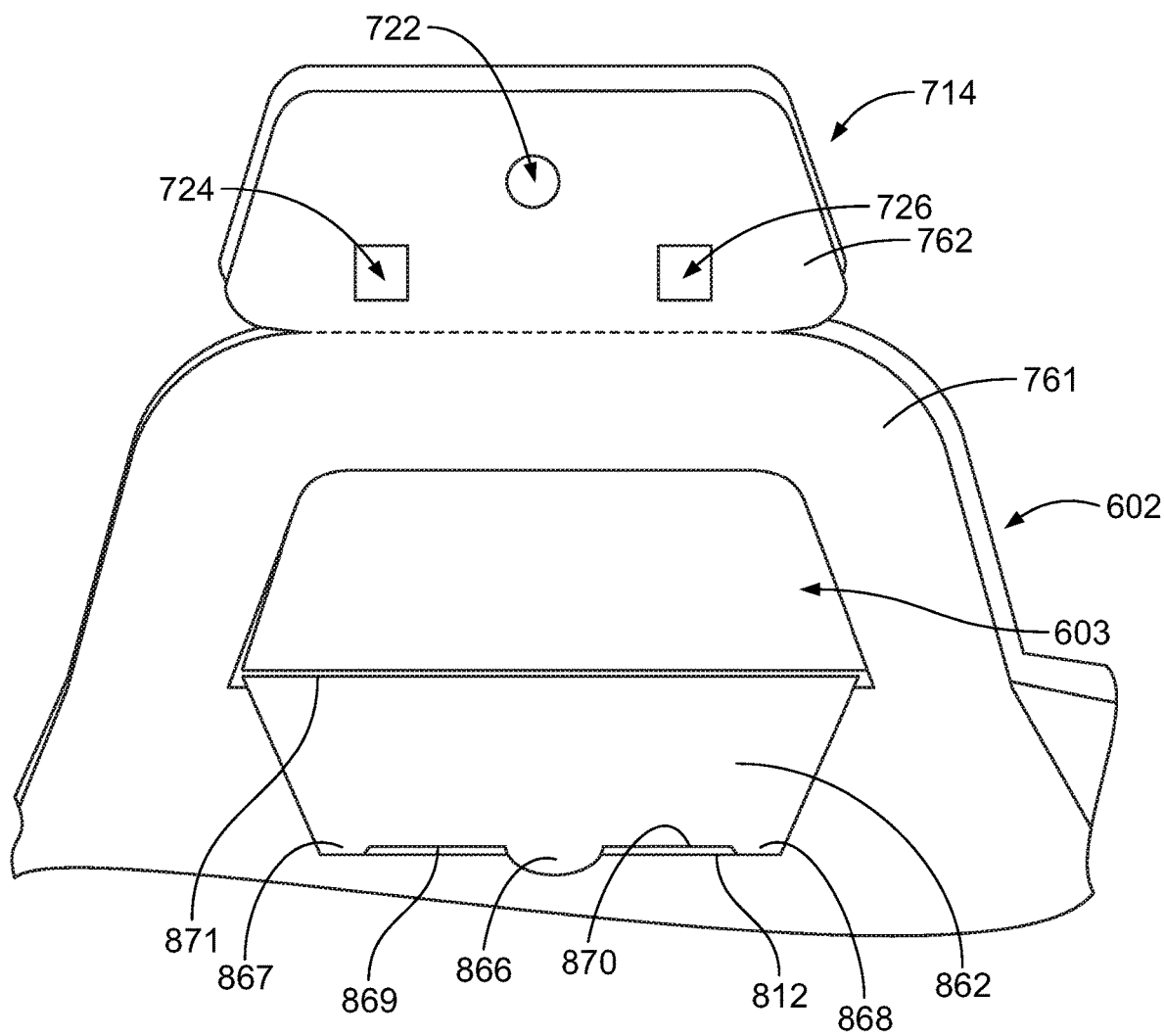
FIG. 6D illustrates a perspective view of the handle, according to an example embodiment.

FIG. 6D displays a handle 602 with a handle opening 603. The handle 603 is created by folding the first flap 862 at flap connection 871 such that the second flap 864 is inserted into the handle flap notch 812. Further, tabs 866, 867, and 868 engage the first handle section 761 to keep the first handle section 761 engaged with the second handle section 762. Additionally, sealing materials, such as glue, adhesive, and/or other items may be used on the tabs 866, 867, 868, and/or the adjoining surfaces of the handle sections 761 and 781 to create the handle 602.

In some embodiments, the flaps 862 and 864 may be allowed to close the opening 603 during UAV flight. In this embodiment, once the UAV flight is complete and the package is delivered, the flaps 862 and 864 may then be modified such that the opening 603 is created. In particular, flap 864 may be inserted into the notch 812 and flap 862 may be folded at attachment 871 to create the opening 603 and the handle 602. Other embodiments are also possible.

The vehicle connector 714 may be created by sealing vehicle connector sections 762 and 782 together using glue, adhesive, and/or other items that may be used to attach objects. The hole 722 may correspond to holes 802 and 852. The opening 724 may correspond to openings 804 and 854, while the opening 726 may correspond to openings 806 and 856.

The package 600 may be detached from the vehicle connector 714 at the handle 602 at attachment lines 858 and 808. In one embodiment, the package 600 may be detached by using the string corresponding to attachment lines 808 and 858 to detach the package 600 at handle 602 from the vehicle connector 714. Other mechanisms may be used to detach the package 600 at the handle 602 from the vehicle connector 714, and thus, from the UAV 605.

Figure 7A:
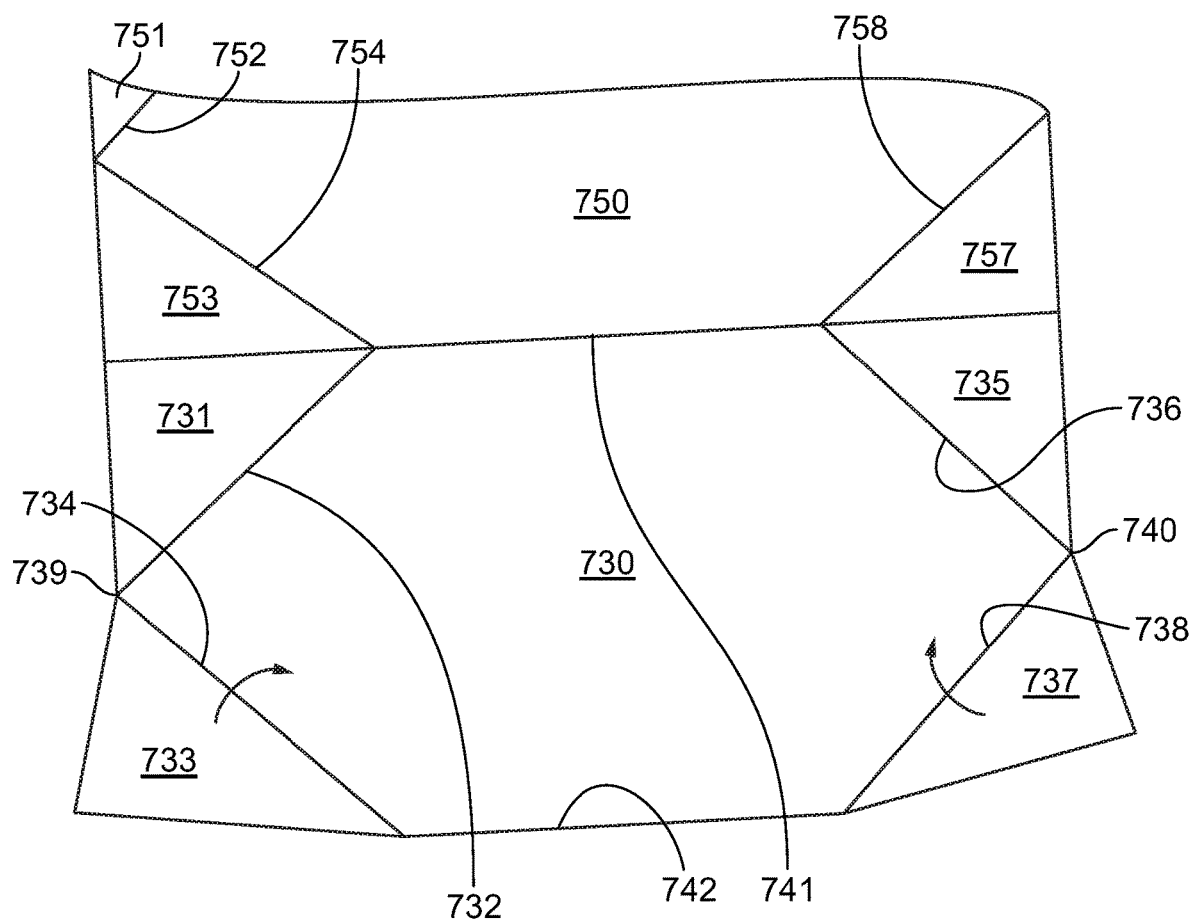
FIGS. 7A, 7B, 7C, 7D, 7E, 7F, and 7G illustrate various views of a sheet of material being folded into a tote package, according to an example embodiment.
Figure 7B:
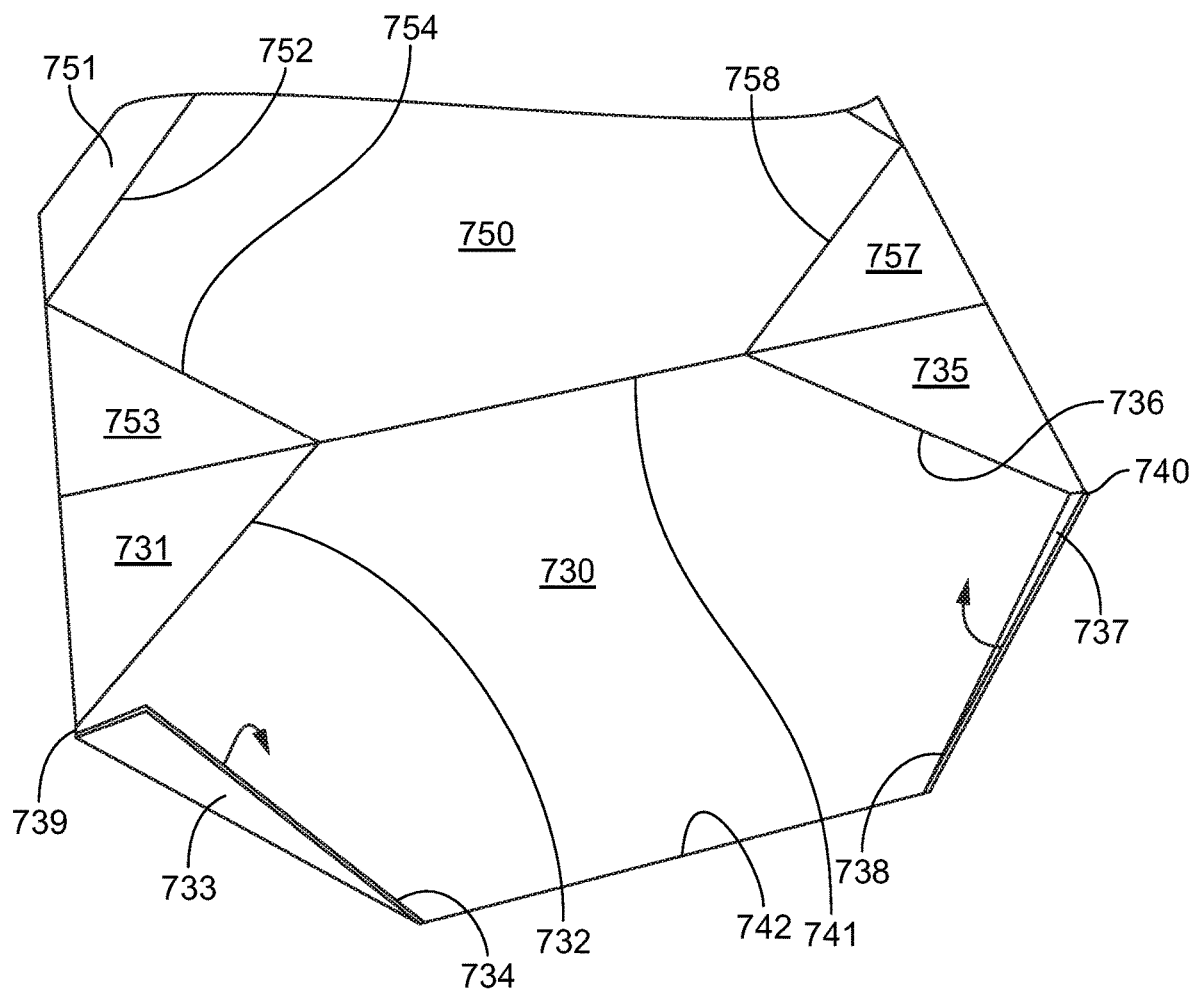
Figure 7C:
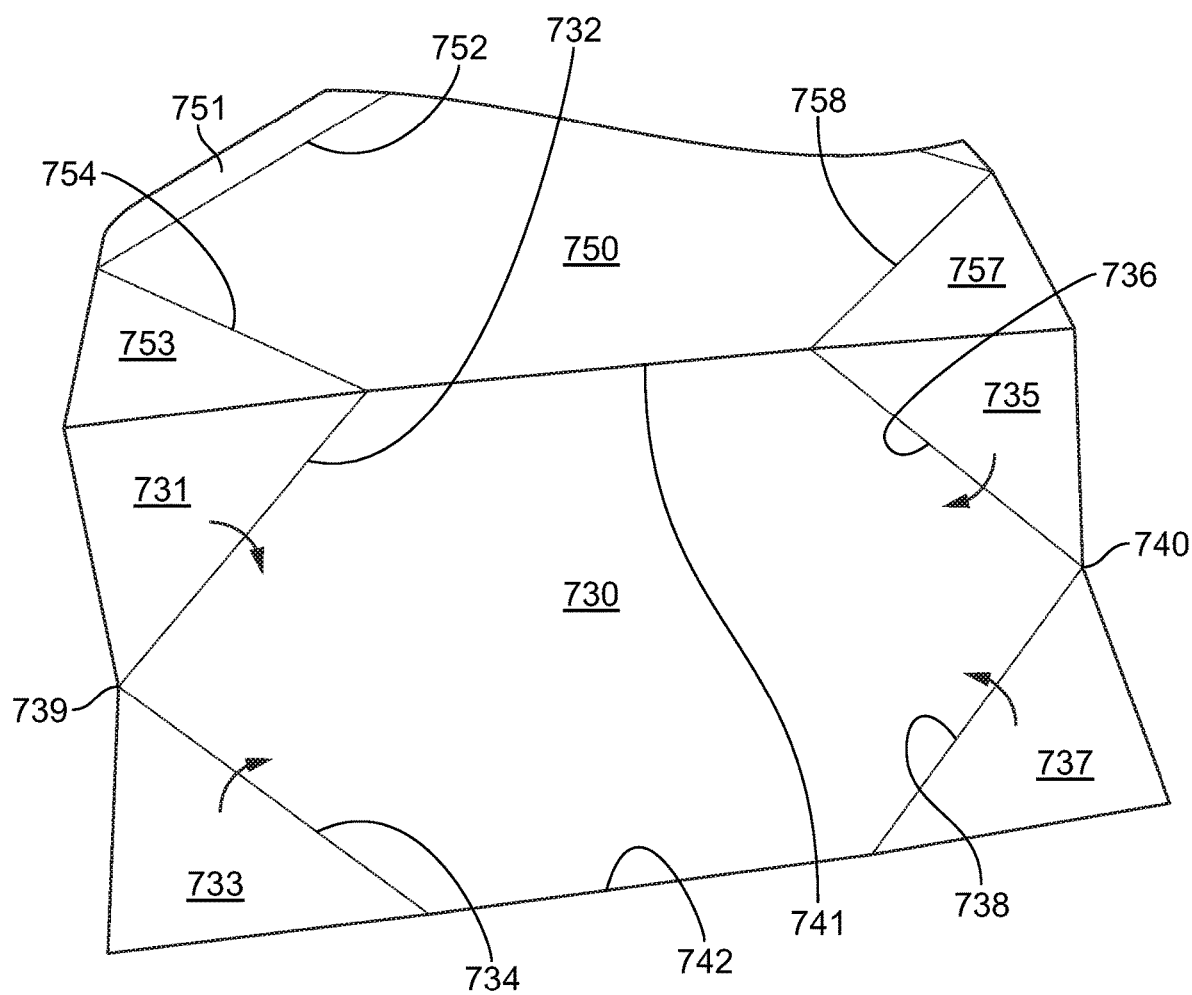
Figure 7D:
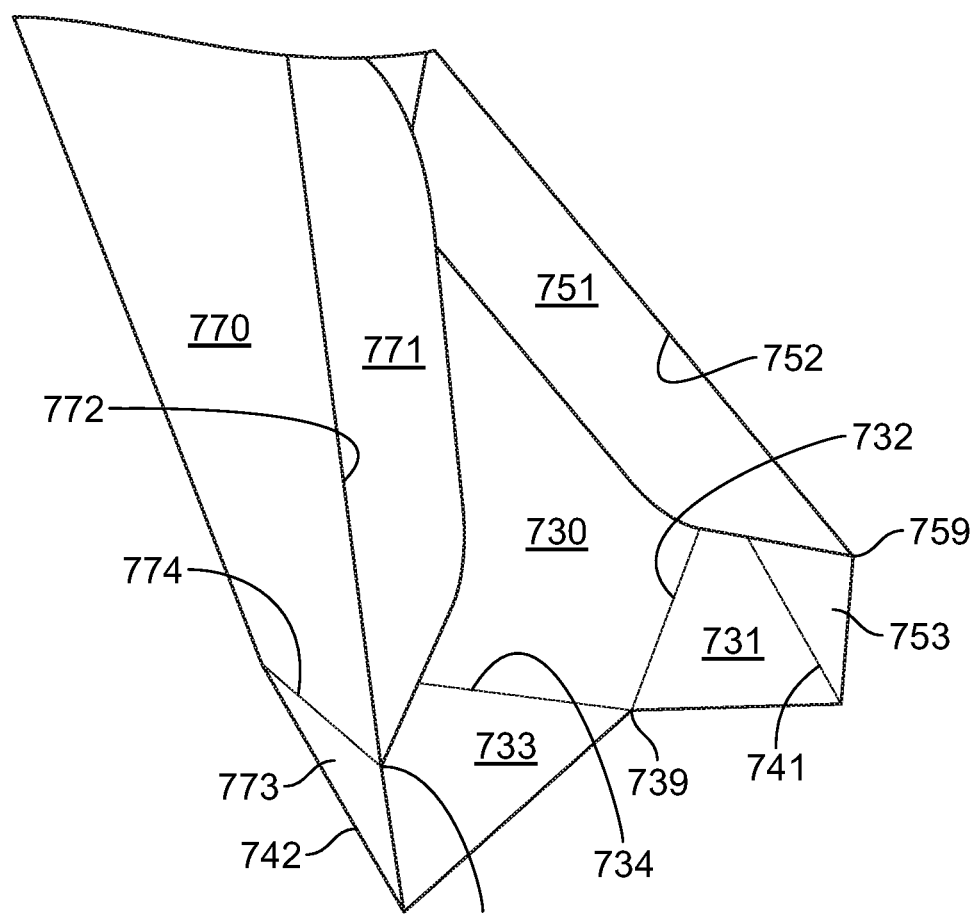

FIGS. 7A, 7B, 7C, 7D, 7E, 7F, and 7G display various steps for folding sheet 728 to generate package 600. FIGS. 9A, 9B, and 9C show steps for folding flaps 731, 733, 735, and 737 along their corresponding flap lines 732, 734, 736, and 738, respectively. FIG. 7D displays the sheet 728 partially folded into package 600. In particular, the sheet has been flipped over from FIGS. 7A, 7B, and 7C, and folded along folding lines 741 and 742. Flaps 751 and 771 can be folded along corresponding flap lines 752 and 772, respectively, and sealed together using glue, an adhesive, or some other object for sealing. The points 739, 759, and 779 can be joined together to create the front portion 704 of the package 600.

Figure 7E:
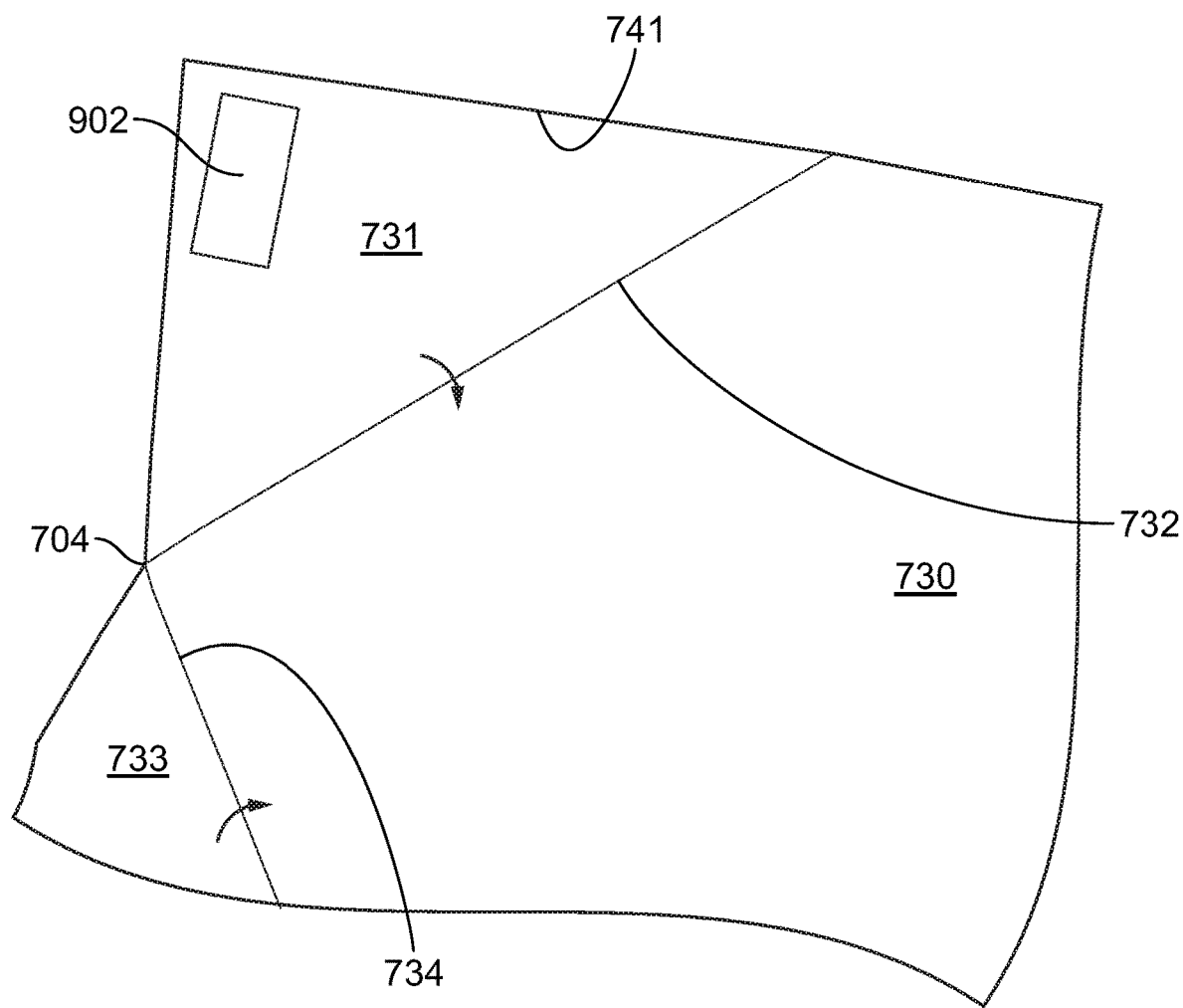
Figure 7F:
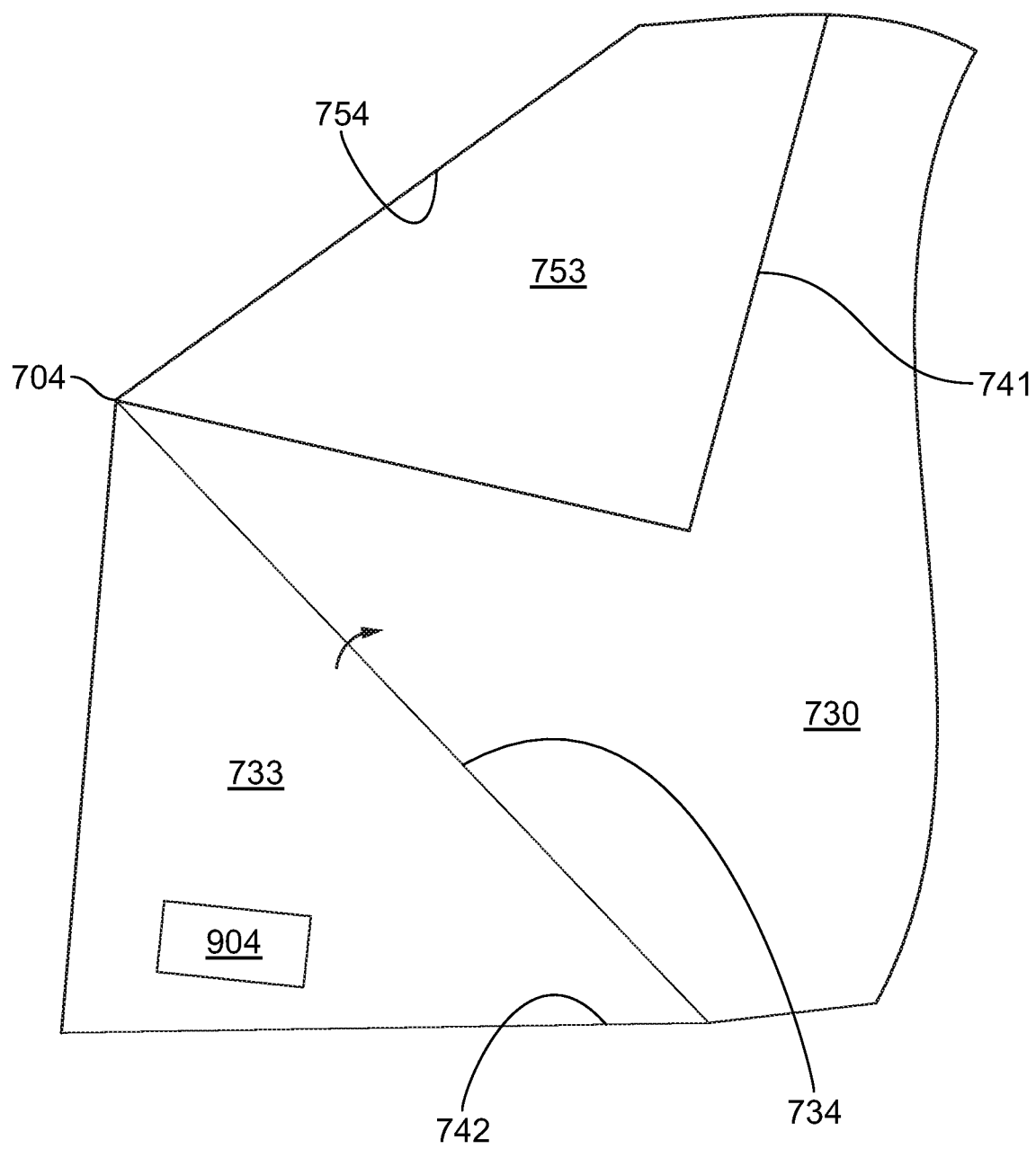
Figure 7G:
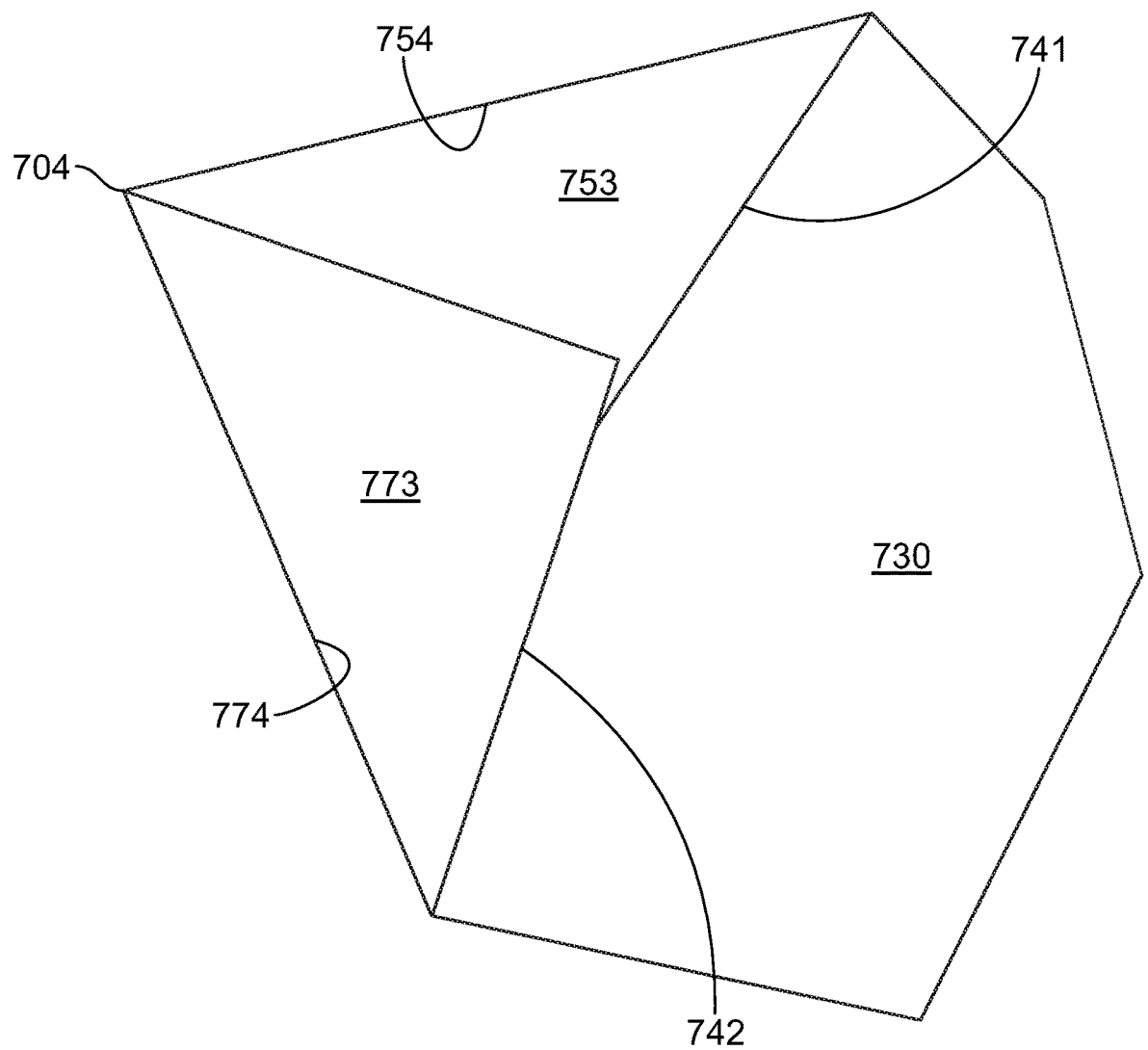

FIGS. 7E, 7F, and 7G display the steps of folding flaps 731 and 733 along their corresponding flap lines 732 and 734 to generate the bottom portion 702 of the package 600. An adhesive, such as glue, is used for adhesive material 902 and 904. Adhesive material 902 joins flap 731 to section 730, while adhesive 904 joins flap 733 to flap 753. Other configurations are possible for folding sheet 728 to create package 600.

VI. ILLUSTRATIVE METHOD(S)

Figure 8:
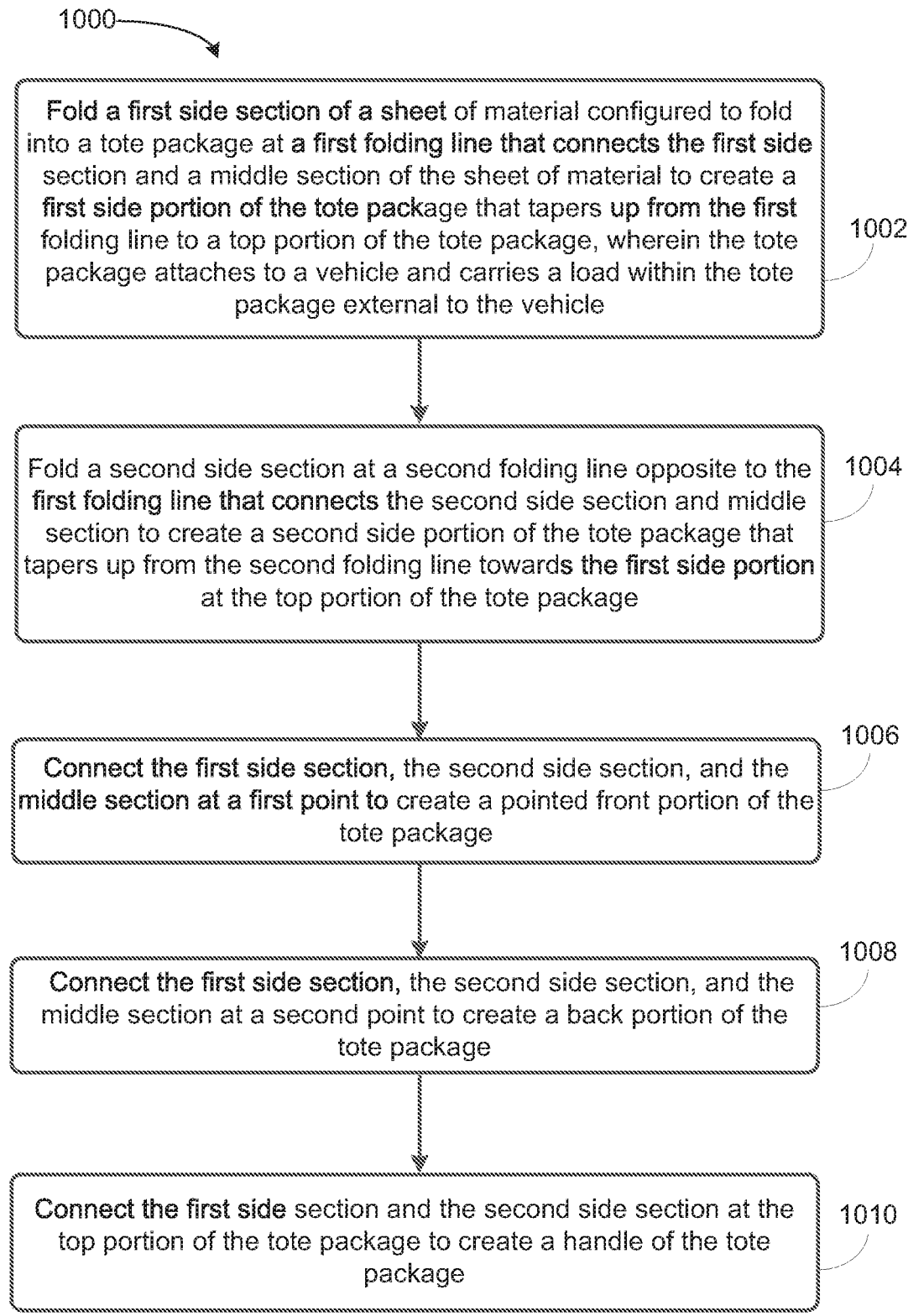
FIG. 8 illustrates a block diagram of an example method.

FIG. 8 illustrates a flowchart showing the method 1000 that may allow for creating a tote package for delivering items external to a UAV by folding a sheet of material, according to an example embodiment. The method 1000 may be executed by a shipper of the package, a manufacturer of the package, an operator of the UAV, or some other entity. Method 1000 may be executed manually, by a machine, or combination of both.

Unless specifically indicated, functions in the flowchart shown in FIG. 10 may be executed out of order from that shown or discussed, including substantially concurrent execution of separately described functions, or even in reverse order in some examples, depending on the functionality involved, so long as the overall functionality of the described method is maintained. Additionally, the method 1000 may include more steps, fewer steps, and/or different steps than those displayed.

As shown by block 1002 of FIG. 8, method 1000 may involve folding a first side section of a sheet of material configured to fold into a tote package at a first folding line that connects the first side section and a middle section of the sheet of material to create a first side portion of the tote package that tapers up from the first folding line to a top portion of the tote package, wherein the tote package attaches to a vehicle and carries a load within the tote package external to the vehicle, as shown by block 1002 of FIG. 8. In some examples, the vehicle may be a UAV. In additional examples, the tote package may be designed to reduce interference effects with the UAV. In particular, the tote package may be designed to reduce drag to reduce fuel costs and improve efficiency of the delivery of the tote package by the UAV.

Method 1000 may further involve folding a second side section at a second folding line opposite to the first folding line that connects the second side section and middle section to create a second side portion of the tote package that tapers up from the second folding line towards the first side portion at the top portion of the tote package, as displayed by block 1004 in FIG. 10. In some examples, the tapering of the first and second side sections creates a more aerodynamic design for the tote package. In particular, the tapered sides may serve as a narrow pylon pushing the frontal area and volume of the tote package away from the UAV. This design reduces the interference effects on the airflow around the wing of the aircraft that may be generated by the tote package. For example, an air shadow reducing lift for the wing(s) of the UAV may be reduced and/or prevented by the tapered design of the tote package. As a result, the UAV may operate more efficiently with reduced fuel costs.

Method 1000 may also involve connecting the first side section, the second side section, and the middle section at a first point to create a pointed front portion of the tote package, as can be seen in FIG. 8 by block 1006. In some examples, the pointed front portion created by connecting the first side section, second side section, and middle section may reduce the front cross-sectional area of the tote package. As a result, the drag of the tote package may be reduced. This design may improve the efficiency of the UAV by reducing fuel costs.

Method 1000 may additionally involve connecting the first side section, the second side section, and the middle section at a second point to create a back portion of the tote package, as shown by block 1008 in FIG. 8. In some examples, when the back portion of the tote package is created by connecting the first side section, the second side section, and the middle section, a stabilizer may also be created at the back portion of the tote package. The vertical stabilizer of the trailing edge of the tote package may dampen the package movement during delivery by the UAV. In particular, the package movement may be dampened if the package is not rigidly coupled to the UAV. By stabilizing the tote package during UAV flight, the contents of the package, as well as the package itself, do not shift around as much during UAV flight. The stabilizer improves the flight dynamics of the UAV, which improves the efficiency and reduces the fuel costs of the UAV during delivery.

Method 1000 may also include connecting the first side section and the second side section at the top portion of the tote package to create a handle of the tote package, as shown by block 1010 in FIG. 10. In some examples, connecting the first side section and the second side section at the top portion of the tote package may also create a tote package vehicle connector that connects the tote package to an adapter of the UAV. The tote package may detach from the tote package vehicle connector above the handle of the tote package. A string, chord, or some other object may be used to detach the tote package from the tote package vehicle connector. In additional examples, the tote package handle may be designed to allow a recipient of the package to easily carry the tote package.

XVI. CONCLUSION

The particular arrangements shown in the Figures should not be viewed as limiting. It should be understood that other implementations may include more or less of each element shown in a given Figure. Further, some of the illustrated elements may be combined or omitted. Yet further, an exemplary implementation may include elements that are not illustrated in the Figures.

Additionally, while various aspects and implementations have been disclosed herein, other aspects and implementations will be apparent to those skilled in the art. The various aspects and implementations disclosed herein are for purposes of illustration and are not intended to be limiting, with the true scope and spirit being indicated by the following claims. Other implementations may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

We claim:

1. A tote package comprising:
   a middle section that forms a bottom portion of the tote package;
   a first side section connected to the middle section, wherein the first side section creates a first side portion of the tote package that tapers upwardly from the bottom portion to a top portion of the tote package;
   a second side section that is opposite of the first side section, the second side section connected to the middle section, wherein the second side section creates a second side portion of the tote package that tapers upwardly from the bottom portion to the top portion of the top portion of the tote package,
   a handle positioned on the top portion of the tote package;
   wherein the middle section, the first side section, and the second side section intersect to create a tapered front portion of the tote package that extends beyond a flat portion of the bottom portion of the tote package.

2. The tote package of claim 1, wherein the tapered front portion terminates in a pointed front portion.

3. The tote package of claim 1, wherein the middle section, the first side section, and the second side section intersect to create a tapered back portion of the tote package that extends beyond a flat portion of the bottom portion.

4. The tote package of claim 3, wherein the tapered back portion terminates in a pointed back portion.

5. The tote package of claim 4, wherein the tapered front portion terminates in a pointed front portion.

6. The tote package of claim 1, wherein the bottom section has a hexagonal shape.

7. The tote package of claim 6, wherein the first side section has a hexagonal shape and the second side section has a hexagonal shape.

8. The tote package of claim 1, wherein the handle includes an opening.

9. The tote package of claim 8, wherein one or more apertures are positioned adjacent the opening of the handle that serve as a vehicle connector where the one or more apertures are configured to be retained by a tote package adapter positioned within an aerial vehicle.

10. The tote package of claim 1, wherein the first side section, the second side section, and the bottom section are formed from a single sheet of material.

11. The tote package of claim 10, wherein the handle is formed from the same sheet of material as the first side section, the second side section, and the bottom section.

12. A method for forming a tote package comprising:
providing a first side section;
providing a bottom section that forms a bottom portion of the package;
wherein the first side section is attached to the bottom section, where the first side section tapers upwardly from the bottom section to a top portion of the tote package;
providing a second side section opposite of the first side section,
wherein the second side section is attached to the bottom section, where the second side section tapers upwardly from the bottom section to the top portion of the tote package;
connecting a front of the first side section to a front of the second side section;
connecting a rear of the first side section to a rear of the second side section;
connecting the first side section and the second side section at the top portion of the tote package;
connecting a front of the bottom section to the front of the first side section and the front of the second side section to form a tapered front of the tote package, where the tapered front of the tote package extends beyond a flat portion of the bottom portion of the tote package.

13. The method of claim 12, further including the step of connecting a rear of the bottom section to the rear of the first side section and the rear of the second side section to form a tapered rear of the tote package, where the tapered rear extends beyond a flat portion of the bottom portion of the tote package.

14. The method of claim 13, wherein the tapered front terminates in a pointed front.

15. The method of claim 14, wherein the tapered rear terminates in a pointed rear.

16. The method of claim 12, wherein a handle is attached to the top portion of the tote package.

17. The method of claim 16, wherein the handle includes an opening.

18. The method of claim 12, wherein the first side section, the second side section, and bottom section each have a hexagonal shape.

19. The method of claim 12, wherein the first side section, the second side section, and the bottom section are formed from a single sheet of material.

20. The method of claim 19, wherein the handle is formed from the same sheet of material as the first side section, the second side section, and the bottom section.

* * * * *